(12) United States Patent
Field

(10) Patent No.: US 10,980,192 B2
(45) Date of Patent: Apr. 20, 2021

(54) METHODS FOR COOLING WATER TEMPERATURE USING HIGH ALBEDO MATERIALS

(71) Applicant: Leslie A Field, Portola Valley, CA (US)

(72) Inventor: Leslie A Field, Portola Valley, CA (US)

( * ) Notice: Subject to any disclaimer, the term of this patent is extended or adjusted under 35 U.S.C. 154(b) by 0 days.

(21) Appl. No.: 16/891,583

(22) Filed: Jun. 3, 2020

(65) Prior Publication Data

US 2020/0288651 A1 Sep. 17, 2020

Related U.S. Application Data

(60) Continuation of application No. 15/499,590, filed on Apr. 27, 2017, now Pat. No. 10,701,871, which is a division of application No. 14/709,288, filed on May 11, 2015, now abandoned, which is a continuation of application No. 12/680,975, filed as application No. PCT/US2008/011689 on Oct. 9, 2008, now abandoned.

(60) Provisional application No. 60/998,404, filed on Oct. 9, 2007, provisional application No. 61/044,463, filed on Apr. 11, 2008.

(51) Int. Cl.
*A01G 15/00* (2006.01)

(52) U.S. Cl.
CPC ................................. *A01G 15/00* (2013.01)

(58) Field of Classification Search
CPC ... A01G 15/00; E01B 2201/00; E02B 15/041; E02B 15/043; F24J 2/10
See application file for complete search history.

(56) References Cited

U.S. PATENT DOCUMENTS

| | | | | | |
|---|---|---|---|---|---|
| 2,440,584 | A | * | 4/1948 | Heltzer | G02B 5/128 359/540 |
| 3,222,204 | A | * | 12/1965 | Weber | B29C 70/58 427/163.4 |
| 3,401,818 | A | * | 9/1968 | Hagen | B65D 88/36 220/216 |
| 3,439,366 | A | * | 4/1969 | Matthews | B63B 5/24 114/357 |
| 3,617,333 | A | * | 11/1971 | Brown | C03B 19/10 428/406 |
| 3,687,329 | A | * | 8/1972 | Baum | B65D 90/42 220/216 |
| 3,998,204 | A | * | 12/1976 | Fuchs | B65D 88/36 126/565 |
| 7,041,221 | B2 | * | 5/2006 | Arnott | B03B 9/062 210/660 |

(Continued)

*Primary Examiner* — Jessica H Lutz
(74) *Attorney, Agent, or Firm* — Shalini Venkatesh

(57) ABSTRACT

A method for cooling the temperature of a body of water having a top surface exposed to sunlight comprises distributing balls such that they lie on, and in direct contact with, at least part of the top surface, the at least part of the top surface characterized prior to the distribution by a pre-distribution surface area; The balls have diameters within a range of 100 microns to 3 mm, and albedos within a range of 0.15 to 1.0. The surfaces of the balls are hydrophilic, such that after the distribution a total wetted surface area greater than the pre-distribution surface area of the water is provided, facilitating the cooling. In one embodiment, the body of water is a natural or unnatural lake or bay.

16 Claims, 22 Drawing Sheets

(56) References Cited

U.S. PATENT DOCUMENTS

| | | | | |
|---|---|---|---|---|
| 8,702,459 B2* | 4/2014 | Flockenhagen | ........... | E02B 3/00 |
| | | | | 441/1 |
| 2003/0139549 A1* | 7/2003 | Savu | ........................ | C09D 7/47 |
| | | | | 526/243 |
| 2009/0211981 A1* | 8/2009 | Russo | ...................... | C11D 3/14 |
| | | | | 210/660 |
| 2010/0314321 A1* | 12/2010 | Niles | ........................ | B01J 20/16 |
| | | | | 210/660 |
| 2013/0339216 A1* | 12/2013 | Lambert | .................. | C12N 1/12 |
| | | | | 705/37 |

\* cited by examiner

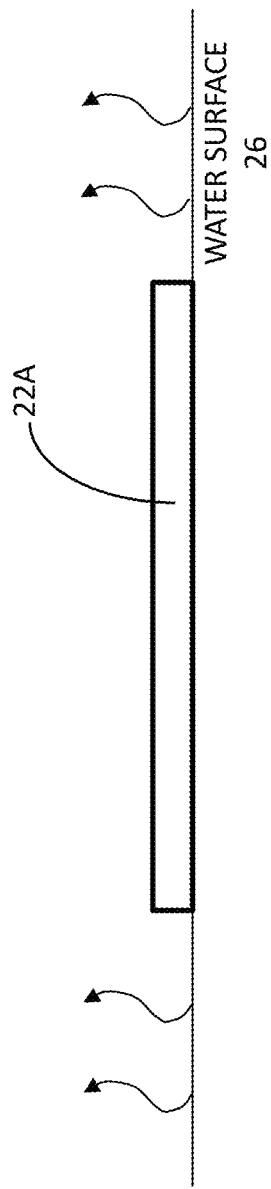
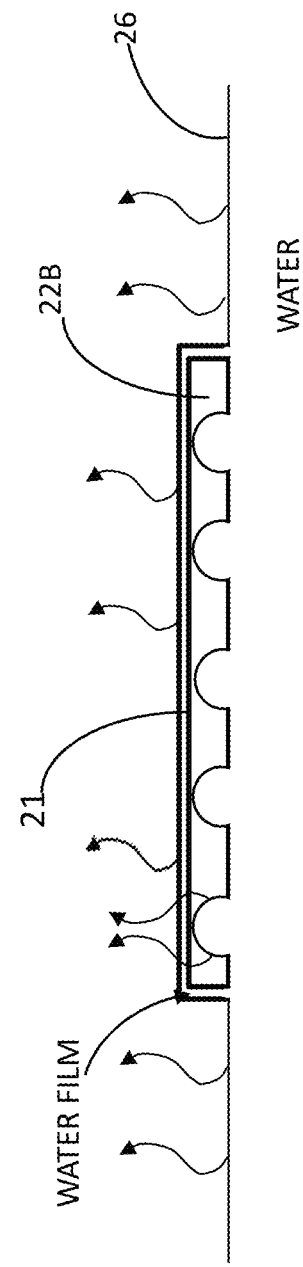

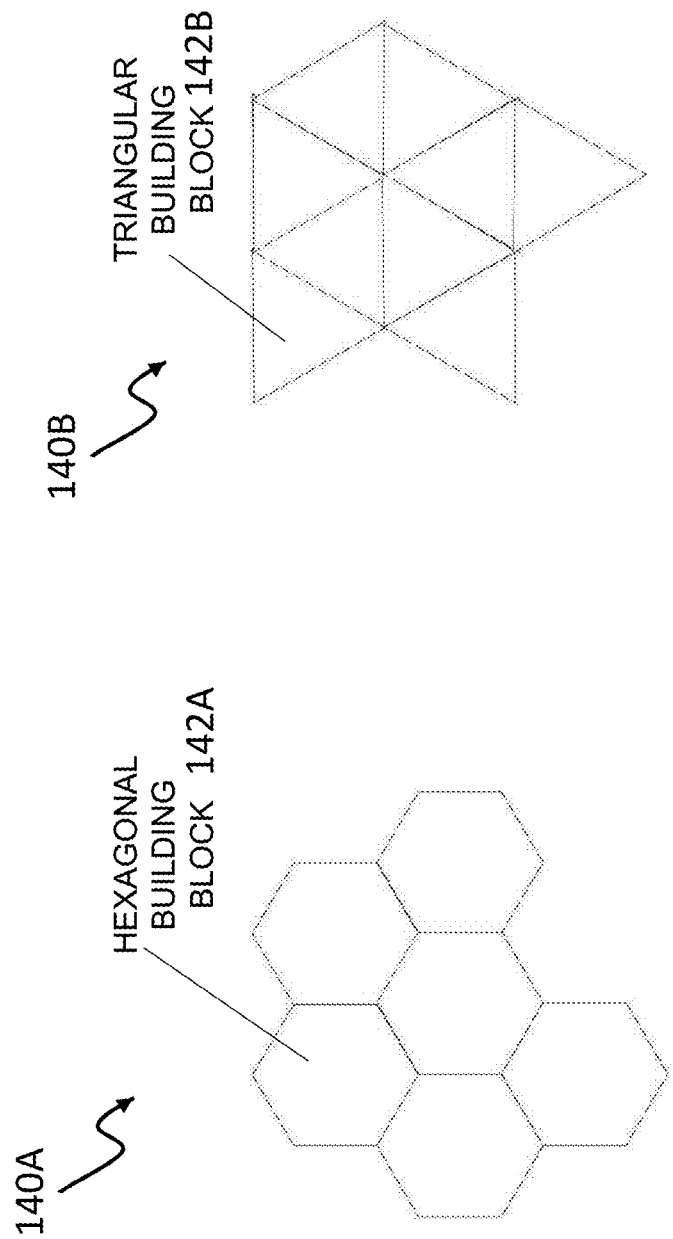

METHODS FOR COOLING WATER TEMPERATURE USING HIGH ALBEDO MATERIALS

CROSS-REFERENCE

This application is a continuation of U.S. patent application Ser. No. 15/499,590, filed on Apr. 27, 2017, which is a division of U.S. patent application Ser. No. 14/709,288, filed on May 11, 2015, which is a continuation of U.S. patent application Ser. No. 12/680,975 titled "SYSTEMS FOR ENVIRONMENTAL MODIFICATION WITH CLIMATE CONTROL MATERIALS AND COVERINGS", filed on Jul. 12, 2010, which is a national stage application of PCT/US08/11689 (WO 2009/048627) filed Oct. 9, 2008, which claims priority to U.S. Provisional Application No. 60/998,404, filed Oct. 9, 2007, and to U.S. Provisional Application No. 61/044,463, filed Apr. 11, 2008, all of which applications are incorporated herein by reference in their entirety, as if set forth in full in this application for all purposes.

FIELD OF THE INVENTION

This invention is directed to systems, materials, and methods of environmental modification with climate control materials and coverings. The invention may include materials which may cause a localized change in albedo and evaporation rate. In addition, the invention may be reversible and may include different materials, designs, deployments, and sensing apparatus and techniques.

BACKGROUND OF THE INVENTION

The international scientific community has reached consensus that ongoing climate change has raised the earth's global average temperature, has had an effect on the earth's ecosystems, and that larger impacts are likely in the future (IPCC AR4 2007). Current and future effects may include an increase in sea level, a reduction in the percentage of the earth's surface covered by the polar ice caps, changes in rainfall distribution and increases in the severity of storms. These changes may in future lead to effects on the oceanic currents and further changes in weather patterns, that could in turn lead to effects as diverse and profound as changes in the distribution of habitable land areas for various species, as well as in the distribution of areas suited to agriculture, and changes in locations of usable coastal ports and shipping routes. A positive feedback loop known as the Ice-Albedo Feedback Effect is involved in the reduction of icecap area, whereby the more the ice melts, the faster the remaining ice melts. This occurs because for a given area, the open ocean absorbs more solar energy (has a lower albedo) than does ice.

Weather patterns may be shifting as a result of climate change. Such changes may include changes in droughts, tropical storm strength and intensity, ocean currents, and wildfires.

Various solutions and geoengineering approaches to mitigate to some climate change effects have been proposed. The most commonly proposed long-term solution is to slow down the effects of global warming by addressing one apparent cause of global warming via a reduction in the generation of anthropogenic greenhouse gases such as carbon dioxide ($CO_2$). The international scientific community agrees that the concentration of $CO_2$ in the atmosphere has increased as a result of human activity and that this has caused an increase of the earth's global average temperature over the past several decades (IPCC AR4 2007).

Many proposals for reduction of the generation of greenhouse gases include proposals to reduce the rate of $CO_2$ generation. For example, $CO_2$ generation may be slowed down by providing for energy and transportation needs through the use of alternative power generation such as solar, wind, hydroelectric and nuclear power, and the use of alternative transportation fuels, such as electricity and various forms of bio-derived liquid fuels. These proposals and others like them are likely an important part of the long-term solution to reducing a man-made increase in $CO_2$, but they could take decades to implement widely, and there are substantial technological, sociological, political and economic hurdles to be overcome before widespread adoption is likely to occur.

Another type of proposed solution is aimed at conducting geoengineering directed toward mitigating some of the effects of global warming. One example of such a proposal is the addition of specific gases to the atmosphere to produce an "anti-greenhouse" effect. Some sulfur-containing industrial pollutants have been shown to have a negative greenhouse effect, leading this idea's proponents to advocate a deliberate increase in these pollutants.

Another proposal to reduce the effects of global warming is to use orbiting solar reflectors. For example, it is proposed that trillions of mirrors be sent up into earth orbit to reflect some percentage of incoming sunshine.

Some parties have suggested carbon sequestration to reduce global warming. Various plans include burying carbon compounds in the ground, and seeding the oceans with iron to increase phytoplankton colonies, with the hope that as the plankton die, the carbon they've incorporated will sink to the ocean bottom.

In another proposal, floating plastic islands may be used to limit global warming. The idea includes covering part of the ocean with a material that has reduced absorption of solar energy and has a higher albedo.

Some difficulties with the methods listed above include their cost, irreversibility (for instance, if the solution overcorrects), the massive public works nature of the solutions, unintended weapons potential, and possible severe secondary problems (such as acid rain or health effects from added atmospheric sulfur compounds). Some negative effects of these proposals may include uncontrolled change in oceanic evaporation rate and change to the local ecosystem, ecological effects (such as a change in the plankton species selection), and unintended reverses of the solutions (such as sudden release of $CO_2$ from sequestration schemes). It is thought this could occur if the temperature of the earth (and/or ocean) increases sufficiently over time to cause a release of sequestered $CO_2$.

There is a need for improved systems and methods of environmental modification that may be applied locally and that may be fully reversible or may be used to correct environmental effects in the opposite direction until the desired stabilization is achieved.

SUMMARY OF THE INVENTION

This invention provides systems and methods of environmental modification with climate control materials and coverings by causing a local adjustment of two parameters that may affect the local climate. The invention may affect (1) the absorption and/or reflection of incident solar energy (albedo), and (2) the rate and amount of evaporation of water. The invention may also contain buoyancy or added floating features, which may aid in the invention's effectiveness. The invention may also be designed to minimize ecological harm. It may also enhance ice nucleation, provide habitat and breeding ground, and intentionally provide open pore-like areas to enhance cooling by evaporative heat transfer.

The invention may include materials capable of having the desired albedo and desired characteristics to affect evaporation. These materials may have varying properties, such as optical properties, wettability, porosity, buoyancy, thermal conductivity, imperviousness, strength, breakability characteristics, and may include or be made from recycled or biodegradable materials.

Climate control materials and coverings may have different designs for different applications. These designs may encompass the basic component of the invention, which may include forms such as balls, plates, sheets, or fluids. The components may be brought together into a unit, such as a building block, which may be formed out of corrals, submerged and above-water netting, or various interconnecting mechanisms. The building blocks may be deployed into clusters which may be arranged in different ways to produce the desired effect.

There may be various methods of manufacturing or assembling the climate control materials. These methods may provide efficient or cost-saving means of producing the climate control materials.

The climate control materials and coverings may be deployed in different locations and environments for various applications, and may be deployed by different means in accordance with another aspect of the invention. The climate control materials may also be reversible. A party may be able to remove the materials, may deploy additional materials with reversing effects, or the materials themselves may eventually self-remove or self-reverse. For example, materials may contain properties that may allow them to self-remove or self-reverse by breaking down or sinking, or from changes in their characteristics from eventual biofouling from the surrounding environment.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2A shows how a material may reduce a local evaporation rate.

FIG. 2B shows how a wettable material may increase evaporation from a situation as compared to a non-wettable material.

FIG. 14A shows an example of hexagonal plates interconnecting to form a building block.

FIG. 14B shows an example of triangular plates interconnecting to form a building block.

DETAILED DESCRIPTION OF THE INVENTION

Figure 1:
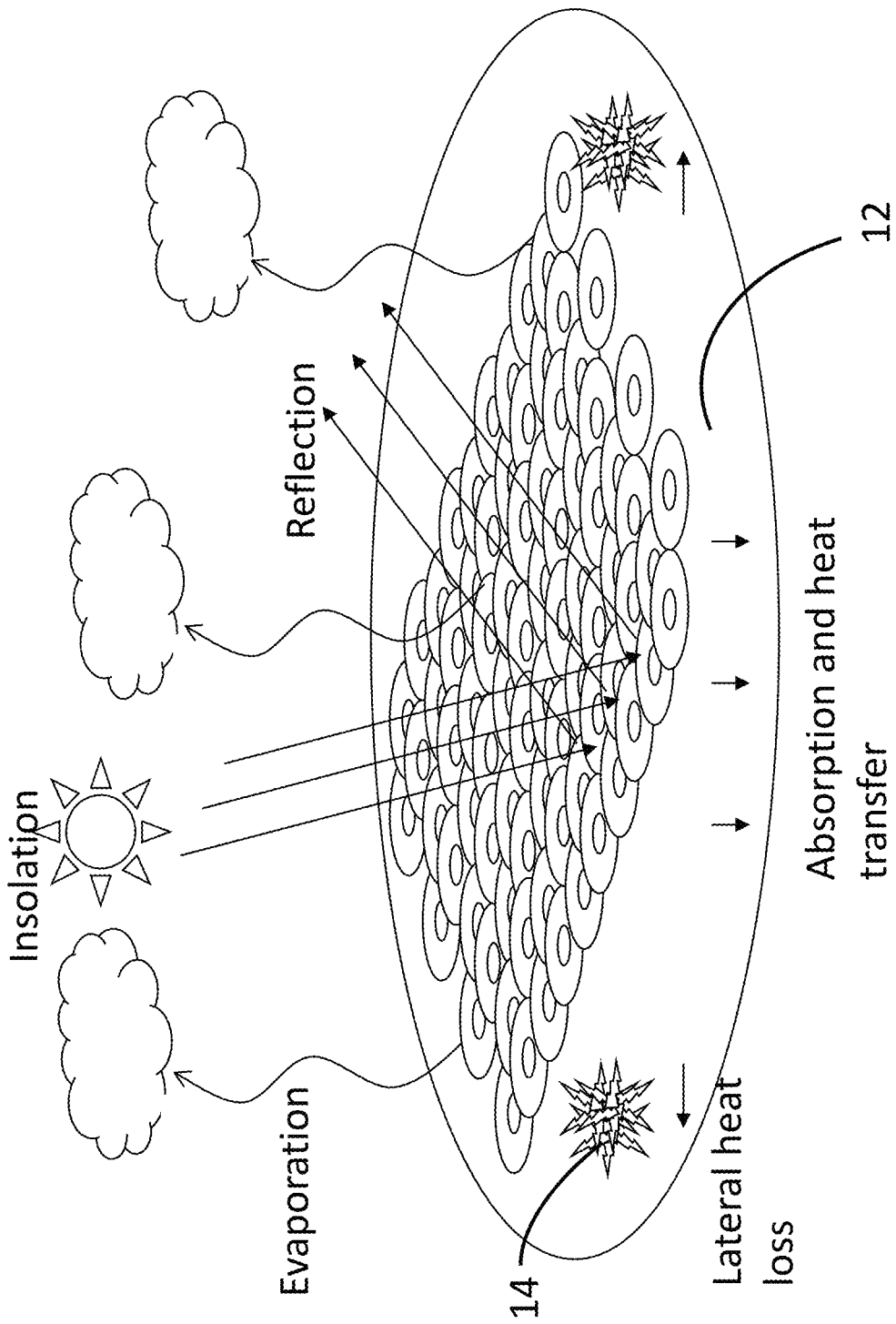
FIG. 1 illustrates one embodiment of the invention with a floating material that may affect albedo and evaporation rate of surrounding and underlying water.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

This invention provides systems and methods of environmental modification with climate control materials and coverings by causing a local adjustment of two parameters that may affect the local climate. The invention may affect (1) the absorption and/or reflection of incident solar energy (albedo), and (2) the rate and amount of evaporation of water. Added buoyancy or floating features of the invention may aid in the invention's effectiveness. The invention may also be designed to minimize ecological harm. As an example of potential ecological harm, materials such as plastic used over wide areas, such as in the floating plastic island proposal of the prior art or the unintentional pollution of the Pacific Gyre with plastic waste, can result in the plastic breaking down over time into smaller pieces and enter the food chain directly, and such materials can also carry other pollutants into the food chain on due to a plastic surface's general affinity for hydrocarbon- and oil-based pollutants. The invention may also enhance ice nucleation, provide habitat and breeding ground, and intentionally provide open pore-like areas to enhance cooling by evaporative heat transfer and by providing an increased effective surface area over which evaporation and/or heat transfer can occur.

The albedo of areas may be adjusted in order to slow down the melting rate, enhance retention, and/or increase the formation of ice and/or snow. The albedo of areas may also be adjusted to provide general cooling effects, even in areas and seasons where ice is not formed. This may include adjusting the albedo to increase the reflection of sunlight. For example, this may involve increasing the albedo of an area above the albedo of open seawater, to at least 0.15. This may also include increasing the albedo further to a level greater than the global average of the earth, or to at least 0.35. Some embodiments may include increasing the albedo to above 0.5, or further to be above 0.7.

In other applications of environmental modification, the albedo may be decreased. Decreasing albedo may reduce the reflection of sunlight. For example, this may be beneficial in applications where increased evaporation rates may be desirable or in order to cause warming.

The ability to control evaporation may be important because blocking or suppressing evaporation by the presence of a material (such as in the floating plastic island proposal of the prior art) could unintentionally cause the temperature of the underlying ocean water to be higher than if evaporation were allowed to occur. The thermodynamic latent heat of vaporization of water is significant, and as the water is vaporized, the liquid water that remains behind may be cooled by providing at least part of the energy of vaporization to the vaporized water. Additionally, if evaporation were to be blocked over large areas of ocean, an unintended climate and weather change could undesirably occur, and rainfall patterns could be altered from these unintended potentially large effects on the earth's water cycle. However, in some other applications of environmental modification besides reducing some of the effects of global warming, the evaporation rate may intentionally be reduced locally and reversibly. One application where evaporation rate may be reduced may be to reduce the severity of tropical storms.

FIG. 1 illustrates one embodiment of the invention, which may incorporate a floating material 12 that may reflect sunlight and enhance water evaporation, which may allow the temperature to drop sufficiently in the exposed water to allow freezing and initial formation of ice 14. The invention may help substantially in ice retention and formation, even if deployed at a time of year when ice formation may not be expected to occur, by enhancing ice retention (slowing the melt) or reducing the heating over the summer, as well as being used at the onset of the hoped-for freezing season.

Sunlight may hit a climate control material and the surrounding water, snow, ice, permafrost, land, or man-made structures. In some embodiments of the invention, the surrounding water may include ocean water, sea water, lakes, rivers, bays, or any other natural or unnatural body of water, or may include any water of any form, such as dew or ground water, and so forth. Also within the scope of the invention is use of the climate control material on or in conjunction with underlying or surrounding glaciers, ice, snow, land areas or man-made structures.

The reflective properties of the climate control material may cause some of the sunlight to reflect away from the water surface, while part of the sunlight may be absorbed, and the energy transmitted to the surface below. The energy from the sunlight hitting the water directly may also be absorbed into the water. Part of the energy in the water, including the water on top of, or absorbed or adsorbed on the surfaces or in the pores or openings of the climate control material, may result in evaporation of underlying and surrounding water, or of rainfall. Also, as water may slosh on top of climate control materials, the materials may provide a place of possible enhanced evaporation or freezing. Water may saturate some of the materials in accordance with some embodiments of the invention, and may cause different rates of evaporation. Evaporation may lead to increased cloud cover, which may affect the climate locally and globally. For instance, cloud cover may reduce the amount of sunlight that may warm the underlying area.

Several systems that may adjust the local albedo and evaporation rate may be encompassed in this invention, and may be used separately or together. Specific embodiments are not meant to limit the scope of the invention, but rather to illustrate some particularly useful embodiments of the current invention.

A. Materials

Systems of environmental modification with climate control materials and coverings may include different properties of the materials themselves. For example, the optical properties, wettability, porosity, buoyancy, thermal conductivity, imperviousness, strength/breaking, source of materials, and biodegradability may be varied for different environmental modifications.

1. Optical Properties

In order to change environmental conditions, an embodiment of the invention may affect the absorption and/or reflection of incident solar energy (albedo). A system may provide materials which may cover a surface, whether the material be floating, partially submerged, or suspended, or spread out on land, ice, snow, or man-made structures that may affect the albedo by their presence. The materials can be painted, dyed, coated with a reflective material, or by other means treated so as to adjust their albedo or if desired, to maintain the stability of albedo over time, or the materials can be untreated. Generally, the surface material, the surface finish, color, translucency, or reflectivity can be chosen to aid in the engineered albedo and reflectivity required, whether the material be selected for its surface properties or treated.

For applications where one may try to cool the local climate, the invention may comprise covering a portion of an area, such as an area of ocean or a darkened or melting glacier, with a material that may reflect at least part of the incident sunlight (in other words, a material with high albedo). For example, cooling an area may include covering the area with a material with a lighter color or with higher reflective properties. By using a material of higher albedo, solar absorption may be reduced, and re-radiation of energy may be altered in a desired manner.

Albedo of a system may also affect the evaporation rate of water associated with the adjusted areas and the areas surrounding them, and may also affect the relative humidity of the adjusted areas and the areas surrounding them. For example, a higher albedo may decrease solar absorption, which may reduce evaporation.

Some examples of materials that may be used as coverings and change local albedo may include, separately or in combination: (1) glass or plastic objects, or other objects of varying compositions, hollow or not, of a spherical or other shape, including but not limited to hollow glass spheres, glass spheres, cenospheres, ceramic spheres, plastic spheres; (2) natural or synthetic fabrics or plastic sheets with controlled porosity, wettability and buoyancy, entrained air or gases, or separately buoyant or suspended features; (3) oil or other coatings, including crude oil, vegetable oil, or mineral oil; (4) plastic bottles, scrap plastic or plastic sheets; and (5) biological materials, such as hay, daisies, or feathers, which may have a possible coating, such as a spray plastic coating, to enhance the lifetime of the material in water, maintaining its buoyancy and albedo. These materials may or may not be treated as necessary to control their albedo.

One embodiment of the invention may provide climate control materials with one or more material interfaces that may affect the albedo of the material. For example, a material such as a hollow transparent ball may have some sort of gas (such as air) inside. Transparent or translucent materials with bubbles inside may provide additional gas/solid interfaces. Similarly, opaque or reflective materials may have bubbles inside as well. There may also be liquid inside a material. Multiple reflections from various interfaces may affect the reflectivity and albedo of the material.

In addition to adjusting albedo, the optical properties of climate control materials may also be chosen or treated in order to provide ease of detection from satellites or other remote sensing devices. Adjusting optical properties such as surface, color, translucency, or reflectivity may aid in sensing applications, which may provide information and enable tracking and control of the materials if necessary. Adjusting optical properties of materials may not only apply to optical sensing devices, but may have effects which can be read by other devices. For example, climate control materials with certain optical properties may also have a unique heat signature which may be read by a thermal sensing device.

2. Wettability/Hydrophilicity

In order to change environmental conditions, an embodiment of the invention may affect a local evaporation rate, which may be important because evaporation may affect the temperature of the surface, or of the underlying or neighboring surface or body of water, ice, or snow. For instance, FIG. 2A shows how the presence of a material 22A may block or suppress evaporation from an underlying surface 26. Such blocking or suppressing evaporation may cause the temperature of the underlying surface to be higher than if evaporation were allowed to occur.

The invention may provide variations in implementation that may affect the evaporation rate of associated fluids, which may include the use of hydrophobic or hydrophilic materials and details of coverage and effective pores to decrease or increase evaporation rates of the underlying surface, such as ocean water if the climate control materials and coverings are partially suspended or floating. An implementation that favors at least some evaporation may lead to cooler water temperatures (from the significant latent heat of vaporization of water) and therefore to cooling and, over time, more favorable conditions for ice and snow formation and retention. Additionally, if an increase in cloud cover results from the added evaporation, this could aid in cooling and potentially in added snowfall. Adjusting local evaporation rates may initiate complex effects of water and cloud cover on albedo, warming, or cooling. Variations of evaporation rates may be included within the invention for different applications.

In order to affect the local evaporation rate, the material can be wettable and/or distributed with an open area of water associated with it. FIG. 2B shows a wettable material 22B which may allow for evaporation of underlying, accompanying or associated film of water. The material may have water on its surface 21 which may evaporate readily. Increased wettability of a material may increase a surface area where evaporation may occur. The materials' wettability (hydrophilicity/hydrophobicity) may be adjusted in order to achieve the desired evaporation rate of water. One implementation may be for a material to have a wettable surface, or to coat it with a thin layer of material that may make it wettable, which may increase the evaporation of the underlying or associated water and prove to be advantageous in cooling applications, taking advantage of increased surface area available for evaporation that can result, for example, from increased porosity, roughness, or shaping of the surface. However, it may be preferable for some other applications and variants to have a non-wettable/hydrophobic surface.

In some instances, some precautions or treatments of climate control materials to maintain the degree of wettability or contact angle against biofouling and biodegradation may assist with long-term performance. For example, this may include a treatment such as a periodic cleaning of the materials. In another example, this may include coating the materials with a coating that may be resistant to the effects of biofouling, such as $TiO_2$.

3. Porosity/Roughness

Figure 2C:
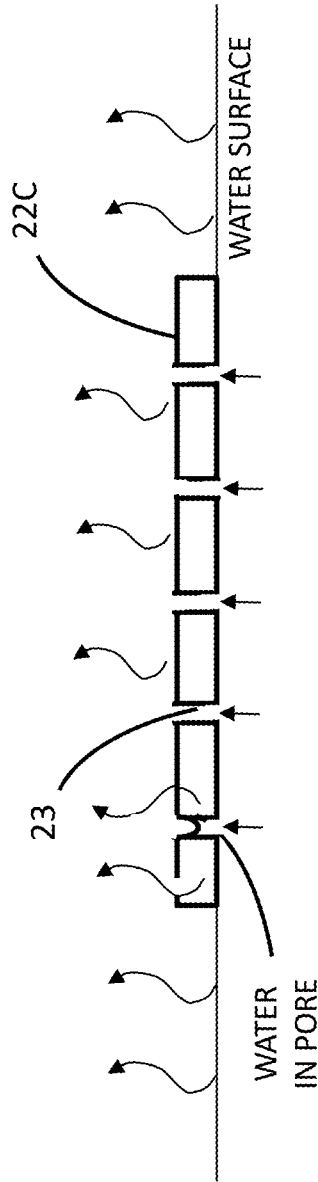
FIG. 2C shows how a material with pores may increase evaporation from a situation as compared to a non-porous material.

The evaporation rate of water associated with an adjusted area or surrounding area may also be affected by details of coverage and effective pores or openings in a material to decrease or increase evaporation rates of water such as ocean water. Pores in a material may vary in size, shape, structure, or wettability to affect the evaporation rate of surrounding and associated water. Materials may have pores or various surface designs that may provide differing surface areas which may affect the evaporation rate of local water. Heat transfer through fluids in pores or pore-like structures may affect evaporation. FIG. 2C shows a material 22C with pores 23, which may enhance evaporation through an increase of the effective surface area of water which can evaporate.

Materials may be selected for their material properties which may include a natural porosity or increased surface area for evaporation. For example, materials such as hay, straw, wood, sawdust, paper, or fabric may be naturally porous materials, and may be naturally buoyant as well. The pores and openings may also have multiple dimensions and directionalities, as would be found especially in uses of mixtures of materials and types of materials, and if natural fibers or materials are included.

Figure 2D:
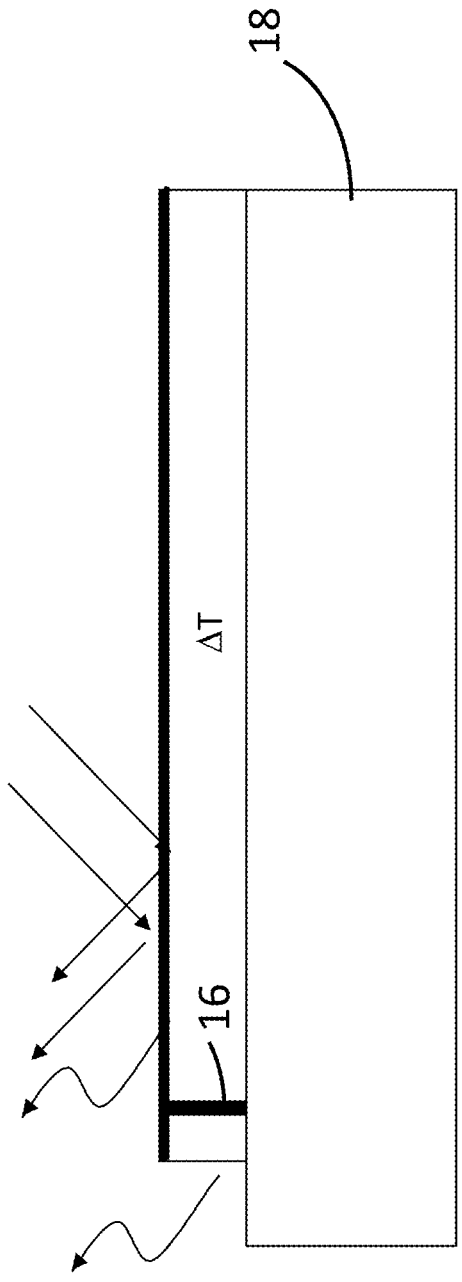
FIG. 2D shows how a material may allow separate tailoring of surface wetting, porosity, reflection and/or albedo, and heat transfer as compared to an open surface.

The pore structure and wettability can be tailored to enable a designed degree of evaporation to occur, to allow a designed-in degree of cooling. The interaction of the material with the water may also act to locally increase the temperature of a film of water in the pores on the surface and may concentrate the energy at the surface, and can affect the heat transfer for and from evaporation, as illustrated in FIG. 2D, which also shows how a material 22D may allow separate tailoring of surface wetting, porosity, reflection and/or albedo, and heat transfer as compared to an open surface. Limited heat transfer through material and pores (as opposed to though water alone) could lead to greater temperature, and greater evaporation, in a top layer of water.

The pores can be engineered to be of a size to enhance evaporative cooling and maintain trapped air while discouraging excessive flow-through of water to the top surface of the material, device and/or system, to avoid sinking it. Additionally, external engineered floats, suspensions and/or buoyant features can be added to suspend the material at the proper position to be effective.

Figure 3:
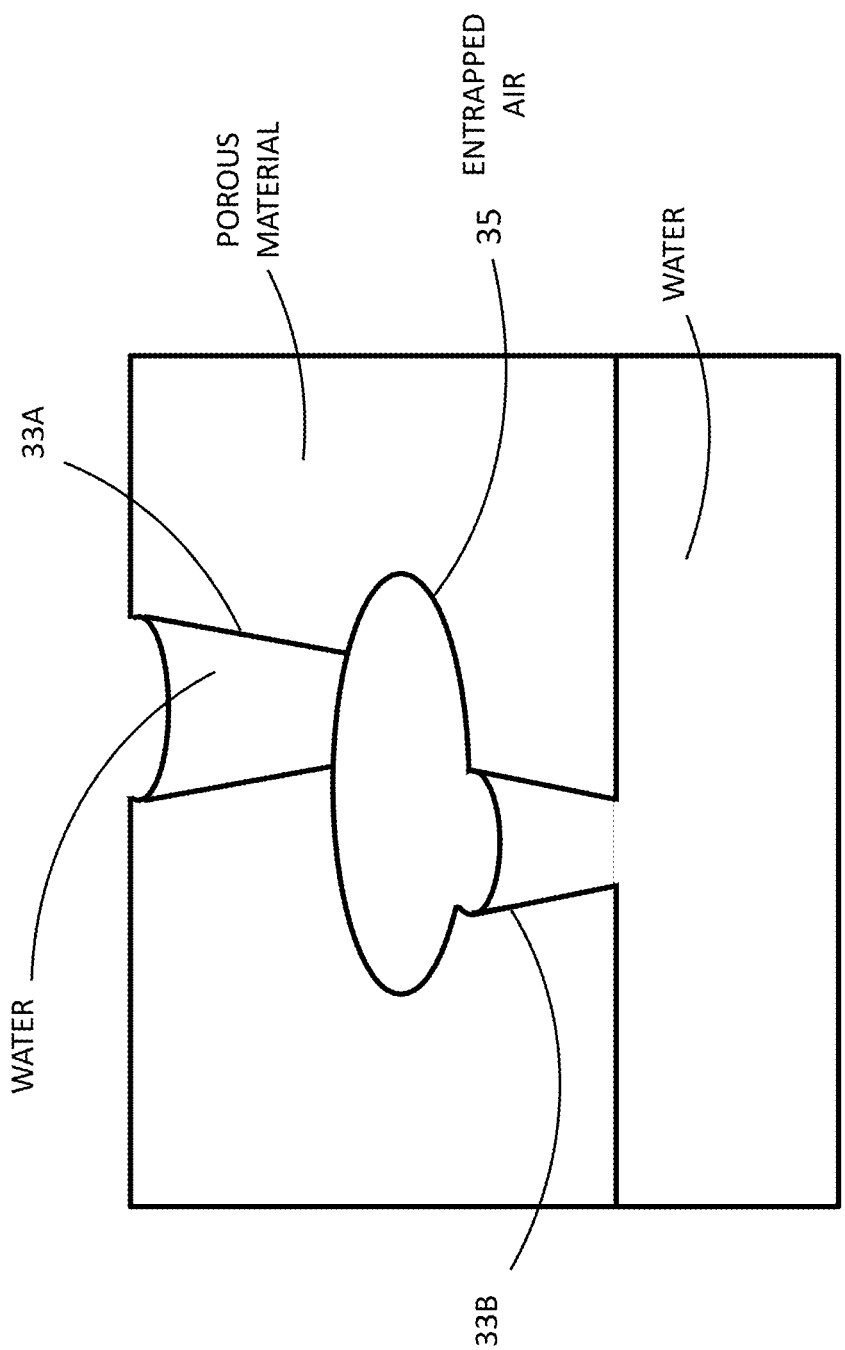
FIG. 3 shows one embodiment of the invention with a dual-tapered pore structure.

The designed diameter and shape of the pores can be made to encourage air to be trapped in an interior layer, as illustrated in FIG. 3, and to route any excess air to the top of the device. The device may be produced by methods to have surfaces be either wettable or nonwettable where desired (such as being wettable on the underside of the device and in the funnel-shaped pores 33A, 33B shown). The pores can be tapered, slanted or staggered as shown, so as not to let sunlight directly through into the water below, or they can be straight-through which may let more energy through to the ocean or underlying area but provide a less-complicated structure. In some situations, it may be desirable to let some degree of sunlight through to the ocean water, to support the local oceanic and under-ice ecosystem. The structure may have a double layer of pores with an embedded air pocket 35, or may have a single layer of pores without said air pocket included. The structure may have wettable walls.

FIG. 3 shows a side view illustration of a dual-taper pore structure 33A, 33B with an entrained air feature 35 that may assist in maintaining buoyancy. In a double-layer design with tapered pores, a wider channel may result in smaller difference between the pressure in the gas and the liquid, while a narrower channel may result in a higher pressure difference between the gas and liquid. The differential in pressure across the air/liquid interface may be higher, the narrower the pores, or the higher the curvature of the interface.

Figure 4:
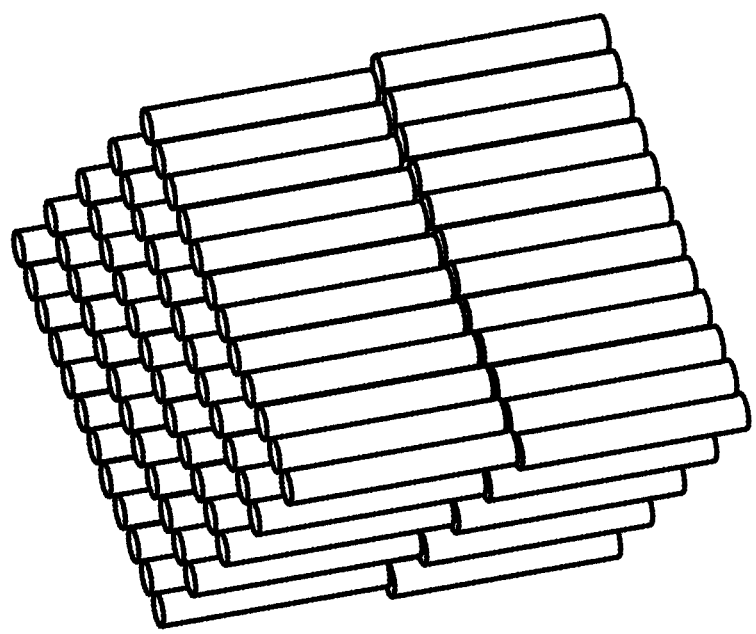
FIG. 4 shows alternate dual pore structures.

FIG. 4 illustrates a dual pore structure. The pores may be staggered for sunlight blockage from the ocean, or may be straight for ease in manufacturing of the part. The pores may be packed in a number of different arrangements. For example, the pores may be hexagonally close packed to allow the greatest pore density, which may increase evaporation. The walls of the pores may be wettable, and/or may have a low contact angle, and the area over which air/liquid interfaces, and therefore evaporation, can occur inside the pores may be greater than that for an equivalent flat area, arising at least in part from the curvature of the air/liquid interface and/or the wettability of the interior pore surface area.

In alternate embodiments of the invention, there may be any number of layers of pores that may be staggered, straight, or a combination thereof, or that interconnect in a possible variety of tortuous, non-orthogonal manners.

For a pore design using entrapped air, pore diameters in the range of sub-100 microns, or even 15-microns or less, can be advantageous in this invention. The smaller the pore diameter, the higher the pressure that can be held in the pore and the greater will be the control over the entrained air.

In an alternative design, air bubbles can be sealed into the device, much as air is sealed into bubble wrap. In addition to affecting the local evaporation rate, porosity can also affect the buoyancy of a material, as discussed below.

4. Floating/Buoyancy

In an embodiment of the invention where the climate control materials may be floating in or on a liquid, one may want to control the buoyancy of the covering depending on the application. For some applications, it may be preferable for materials to be floating high in the water, whereas in other applications, it may be more preferable for materials to be floating lower down. The height of a material's floating may result in interactions with optical and evaporative characteristics.

One way to control floating may be through porosity. For example, the climate control covering may include a material, such as a plastic sheet or plate, with a defined porosity. Buoyancy can also be built into the material by using of lightweight materials, such as certain lightweight plastics. Buoyancy may also occur by incorporation air captured within materials, such as through hollow glass spheres in the plastic formulation or within fabrics, or by deliberately entrained air in the plastic sheets, or with separate buoyancy-related features as part of the system infrastructure.

Alternatively, or additionally, the invention can provide a buoyant support for the materials, such as a support for a plate structure. One example of a support mechanism and plate structure is a central support with a hexagonal-like plate structure anchored to it in sections. Buoyancy or suspension may be provided by the materials themselves or by the support structure for the materials.

One application for a buoyant climate control material may be to provide a pullout (temporary resting place for wildlife during migration) and for wildlife habitat. A support structure or deliberately included air can be engineered to provide sufficient buoyancy or support to act as a pullout, which may enable species such as polar bears, walruses, or any other species to rest, breed, or move on the pullouts. Having such pullouts may enhance the survival of a species which may be currently suffering under conditions of reduced ice, much as nest boxes may be currently used for threatened avian species. The additional area created by the pullouts can help with breeding cycles. For example, for a large enough plate area to provide enough buoyancy for a polar bear pullout, the plate may preferably have a thickness of at least 10 cm, and a percentage of entrained air of well over 50%.

Other applications may exist where a lower buoyancy for a climate control material may be preferable. For example, it may be preferable for materials to decrease in buoyancy as time goes on so the materials may eventually take on enough water to sink after a period of time. This may be one method of reversing the process and removing materials from the surface of a body of water.

5. Imperviousness

In one embodiment of the invention, the climate control materials and covering may be treated in order to prevent or reduce their ability to absorb, transport or concentrate industrial pollutants already present in the ocean. Such treatment could consist of enhancing wettability, to reject hydrocarbon-like (or non-polar) pollutants, increasing strength, reducing biodegradation, or of tailoring the surface porosity or roughness to minimize affinity and capacity for pollutants of the greatest concern.

In another embodiment, the material may be designed to be impervious to environmental conditions to preserve the desired qualities of the material. For example, if the color of the material is a desired quality for controlling albedo, the material may be such that it is resistant to fading, or if the material would ideally maintain a particular shape, it would be resistant to breaking. The material used can also be waterproof, such as a plastic or plasticized fabric.

In one implementation, using physical, but non-biologically active, materials may minimize any impact to crops or wildlife if the materials or parts thereof wash ashore.

6. Strength/Breaking

A system in accordance with the invention may also provide materials of different strength. For example, it may be preferable in an embodiment of the invention that a material be strong enough not to shatter in a storm. For some applications, strength and durability of a material may be preferable to provide environmental effects for a sufficient length of time. Furthermore, strong, non-breaking materials may be able to minimize injuries that may occur if broken materials were to come to shore or be ingested. For example, if a material was made of glass or plastic, it could cause injury if it were to break in a jagged manner. In some implementations, materials with rounded edges or corners may be less likely to break. For fabrics, it may be preferable to have the materials biodegrade over time, reducing initial costs and providing a built-in timed removal of the system.

For alternative applications, it may be preferable for a material to come apart or break into smaller pieces after a length of time. This may be a means of reversibility. For example, if a silica-based material were to start out as non-harmful sand-like pieces, or were to eventually break apart in a non-harmful manner, it could be like or become like sand and have relatively little ecological impact.

One aspect of a material may be how it breaks. Some material properties may be designed that if a fracture were to occur, it would occur in such a manner as to provide a smooth or rounded edge, rather than a jagged, potentially harmful edge. Some materials may also be designed to crumble rather than fracture, so that the material could break into smaller pieces that may be more safely ingested or have lesser ecological impact. The size of the particles that a material may crumble into may be controlled.

7. Reversible Properties

One embodiment of the invention may be to include climate control materials that may self reverse after a period of time. For example, rather than having to collect the materials, the materials may change local albedo or evaporation rate or be biodegradable after a period of time. For example, the material may be designed so that the albedo and evaporative characteristics may reflect the characteristics of the surrounding environment after a set amount of time, so that they may exert a neutral environmental influence. Alternatively, the material may be designed so that the albedo and evaporative characteristics have a reversing effect, so that they may exert a reversing environmental influence. One could deploy a material that reverses over time, through for instance biofouling or pore plugging or biodegradation, or that removes itself from the active area over time through for instance biodegradation or sinking.

The materials could break after a thermal cycle such as freezing into ice, ensuring that they will sink after helping to form a season's-worth of ice. For instance, freezing materials may enter an opening in the material, and cause the material to crack. In another implementation, deliberately providing a very slow leakage pathway for liquids, such as water, into a chamber that has initially provided buoyancy, such as the gas-filled core of a hollow sphere, can eventually make the material sink, removing it from the surface ecosystem after a specified period of time. In some embodiments, materials may self-remove from carbon uptake. A material may also break apart from wear. Breaking in certain modes may be useful in rendering floating materials more likely to sink, as for instance if a pathway to the buoyant, gas-filled chamber is breached as an outer layer of material is eroded or broken away, eventually making the material sink to remove it from the surface ecosystem after a specified period of time. Furthermore, materials can also be enclosed in a container or bag designed to sink over a period of time and drag the materials down.

B. Design

Systems of environmental modification with climate control materials and coverings may include the design aspects of the climate control materials. For example, the size, shape, design, interaction/connection, and arrangement of the climate control materials may be varied for different environmental modifications.

1. Building Components

The climate control materials and covering may be made up of different components which may interact to form building blocks, which may be deployed in a cluster arrangement.

a. Balls

In one embodiment of the invention, the components of the climate control materials may be made of relatively small floatable objects. The floatable objects may have roughly spherical shapes. For example, the materials can include hollow spheres of glass. Some of their advantageous characteristics may include their ability to float, their wettability, the variety of sizes available, and the potential for a wide range of albedo with the properly chosen color and opacity. Rounded shapes may be preferred for abrasion and strength concerns. Rounded edges may minimize fracturing and breakage. When hollow spheres of glass may wash ashore, if they are made predominantly of silica (one of the most abundant materials on earth), and may be hard enough and properly sized so as not to shatter on the beach, they may appear to wildlife and humans and the ecosystem at large as a particularly rounded form of sand, of a specific color, such as white, with no adverse ecological impact foreseen.

The current invention may be designed to fit into an ecosystem, such as an ecosystem with sea ice, without undue impacts. For example, using small floatable materials may allow marine creatures to surface as usual until the ice forms, and may be easily pushed aside with no harm to the creatures or the system, and may not trap them as larger devices might. Such a deployment may also not interfere with ocean turnover, an essential feature in moving $CO_2$ from the atmosphere to the oceanic depths, and hence an essential element in the planetary ecosystem's natural carbon sequestration.

Small floatable materials may float in an area of ocean in order to enhance ice and/or snow retention and/or ice formation.

The size of the floatable objects can be chosen so as to minimize any ecological impacts on wildlife. For instance, the floatable materials may be of a sufficiently small size to pass through the digestive system of a living creature without blockage. Such a beneficial size could be of sub-millimeter diameter, or hundreds of microns in diameter, or even of sub-hundred micron in diameter. Other considerations of the impact of size on wildlife may be whether creatures eat it, breathe it, excrete it, and whether it collects on their fur/coverings. Smaller-sized materials may have the economic advantage as well of being able to cover a larger surface area with a layer of material while using less overall material (since smaller materials may provide a thinner "monolayer") and therefore result in lower cost. The size of material may also be adjusted depending on optimal height of coverage—greater size may be preferable when a greater height of coverage is desired.

The size of the floatable objects may also be chosen to optimize ice nucleation. It could be particularly advantageous if the floating material does not interfere with ice nucleation either touching or near the floating material, or just outside the assemblage. Some types of ocean ice may nucleate in calm water with an initial disk-like shape, and diameter of 2-3 mm or less. Therefore, if the floatable climate control material were of comparable size or were sized so that gaps between the floating materials were of about this size, ice formation may be enhanced. Furthermore, the ice so formed around such objects could have an especially low thermal conductivity and high albedo due to incorporation of the objects that can be used in this invention. Young, or thin, ice formed in the absence of the floatable objects may have a relatively low albedo, and increasing the albedo of ice so formed could be advantageous in further cooling the ocean areas within and nearby the active ice formation locations.

Hollow ball fishing floats (often known as Japanese-style fishing floats) may be used in an embodiment of the invention. This invention may use larger floatable objects that are too large to be ingested by marine wildlife, and may minimizing any ecological impacts in this way. One example of a larger floatable object might be using the hollow ball fishing floats. Hollow ball fishing floats may persist in the oceans for years, which may be a sign of their ruggedness. Another example may be using plastic bottles.

In one embodiment of the invention, it may be preferable to use a mixture of sphere sizes, which may allow for a greater fill factor (small spheres to fill in the interstices between the larger spheres), allowing for greater overall albedo of the treated area. It may also potentially lead to a greater evaporation rate of associated water, from the greater wettable surface area then available per area treated. Use of at least some small-size objects or spheres may also serve to enhance evaporation overall, especially if a significant amount of evaporation occurs on the surface of the objects with more efficient heat transfer to the underlying water through and around the smaller objects.

One benefit of using relatively rounded climate control materials may be their ability to roll. Climate control materials that can roll may provide aid for efficient heat transfer, as well as mass transfer bringing additional water or fluid to the surface to aid in evaporation. Rolling may also contribute to self-rinsing and self-cleaning of the materials.

Ball-like floatable materials may be used in conjunction with other climate control materials, such as plates or sheets. For example, if either plates or sheets have openings, rounded, cylindrical, fibrous, or other materials may be placed within those openings. Ball-like or other materials can be deployed by means to allow a manner of self-assembly, such as having been shipped in, deployed by a submarine, or dropped from an airplane or helicopter, either with or without other materials or corralling mechanisms. Minimizing assembly time onsite may be advantageous.

Relatively rounded climate control materials of various sizes may be scattered on ice or land surfaces as well to provide environmental modification effects.

b. Plates

Figure 5:
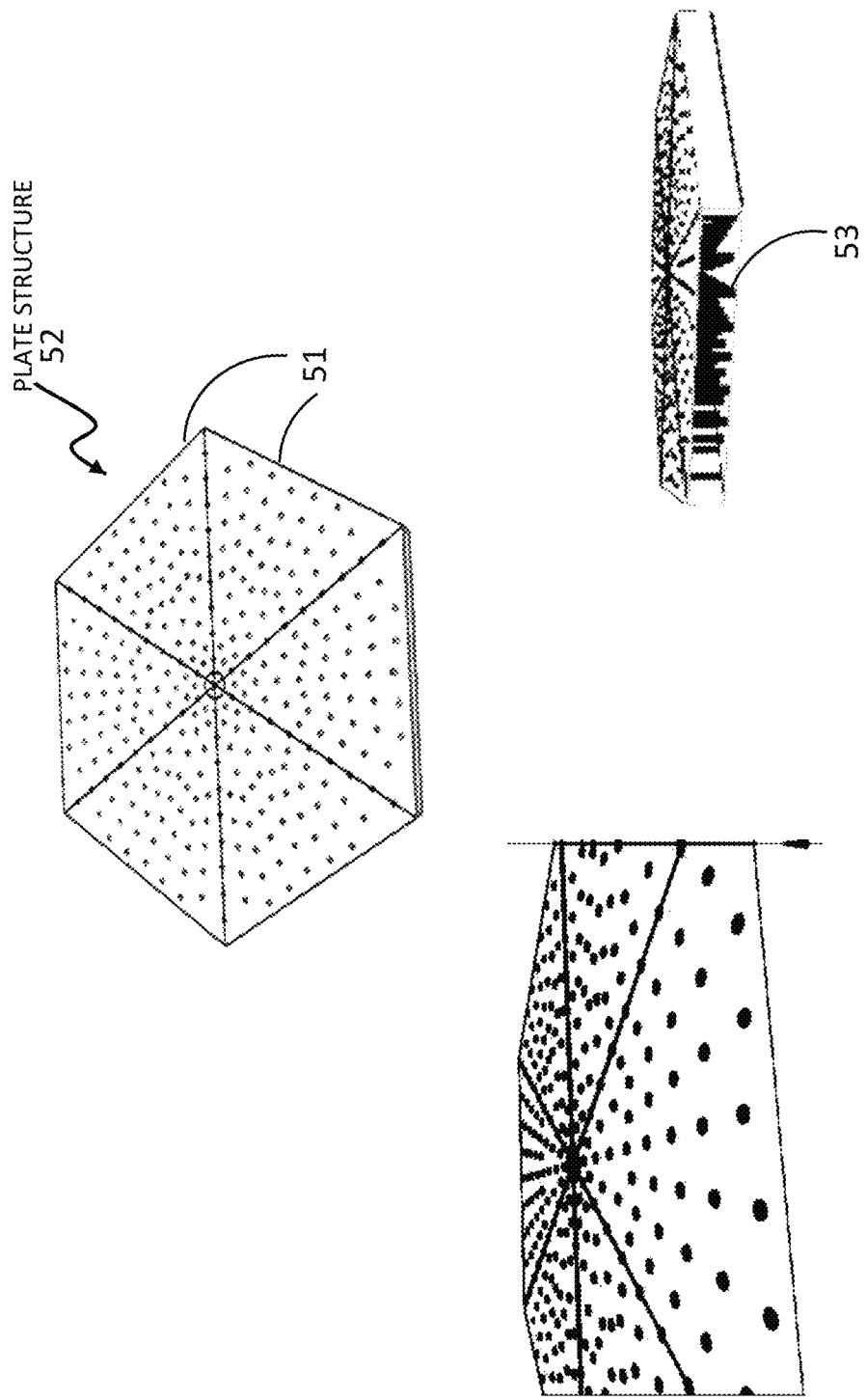
FIG. 5 shows a centrally supported hexagonal structure with engineered porosity.

In an alternate embodiment of the invention, floatable climate control materials may be comprised of plates. The plates may be of different sizes or shapes. For example, a plate may have a hexagonal shape. FIG. 5 shows three views of a centrally supported hexagonal structure 52 with engineered porosity. Such a plate structure may have a central support with a hexagonal-like plate structure anchored to it in sections 51. A hexagonal structure may allow for a hexagonally close packed arrangement of the plates. A plate structure, which may include entrapped air in pockets, pores 53, or supports, can be engineered to provide sufficient buoyancy to act as a pullout to provide a temporary resting place for migrating wildlife, enhancing the survival of species such as polar bears, walruses, or any other species, under conditions of reduced ice as are found today.

The plates can be made of different materials. For example, plates may be made of floatable materials such as plastic. If a denser plastic or other material is used, the plates may be combined with floatable or supporting elements.

c. Sheets

Figure 6:
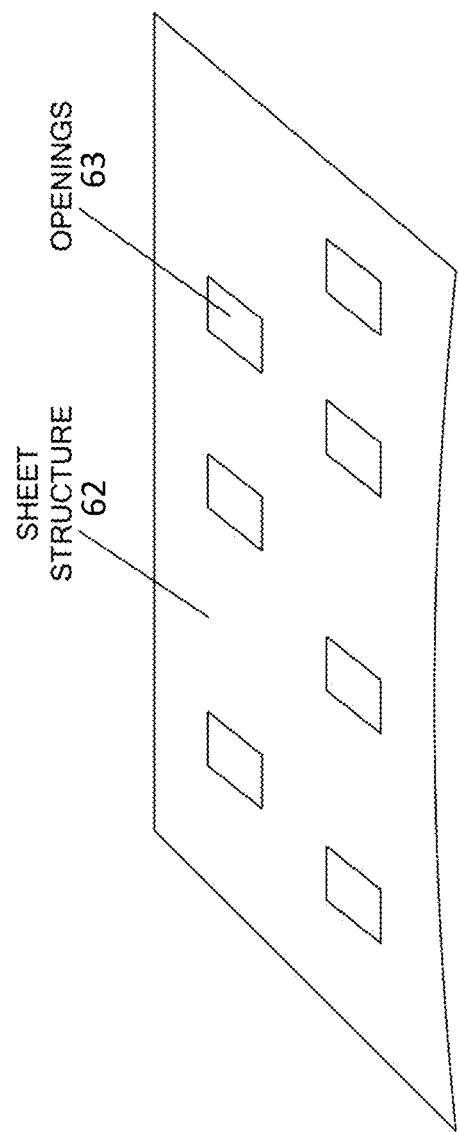
FIG. 6 shows a sheet-like structure with openings.

The floatable climate control materials may be comprised of sheet-like structures in one embodiment of the invention. The sheets may be of different shapes, and may include openings if desired. FIG. 6 shows a sheet structure 62 that includes openings 63. Such openings may have any size, shape, or arrangement. A benefit of a sheet-like structure is that it may provide a thin layer of cover and therefore require less material and cost, and may be easily deployable and reversible. It may also be easy to manufacture sheet-like structures so that they have different shapes. Circular or rounded edges and corners may be preferred to enhance lifetime of the materials, or stress concentrations may be deliberately included to enhance eventual natural degradation or removal. The sheets may be possessed of a selected albedo or reflectivity.

The sheets may be made of different materials. For example, sheet-like structures may be made of a thin plastic. Alternatively, sheet-like materials may be made of fabric, wood product, biological materials, and other materials.

In one embodiment of the invention, the sheet-like materials can be made of fabric with engineered openings, or pores, which can be of differing diameters and morphologies, and tailored wettability and contact angle. Fabrics may also include natural pores and spaces and networks of fibers from the interwoven nature of the material. The openings or pores may also be arranged in different manners. Such pores may affect the local evaporation rate and/or buoyancy.

Different types of materials for fabrics may be used. For instance, a GoreTex-like material could provide excellent vapor exchange, while being possessed of at least some non-wettability in its formulation. Or a marine-compatible fabric treated for longevity in a marine environment may be used. Additionally, reflective materials such as those used in thermal survival blankets or reflective microspheres may be added to the fabrics. Alternatively, a more wettable material could be used.

The sheet-like structures themselves may have various shapes and configurations. For instance, the sheets may have a geometric shape, such as squares, hexagons, or circles, or have any sort of irregular shape.

The sheet-like structures, which may include fabrics, can contain buoyancy features. Such buoyancy features may include built-in buoyancy features or external buoyancy features or physical supports. Examples of buoyancy features may include a floatable material or entrained air pockets within a structure.

Figure 7A:
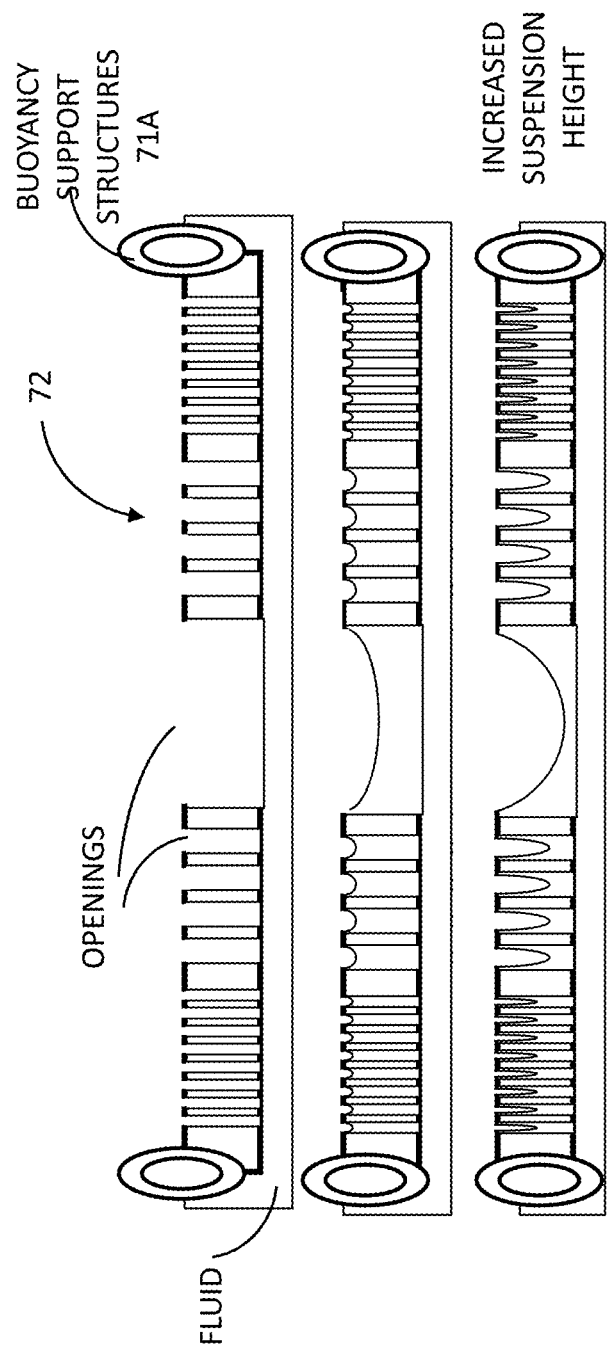
FIG. 7A illustrates how buoyancy features and/or supports may be added at the ends of a sheet-like structure to vary suspension height.
Figure 7B:
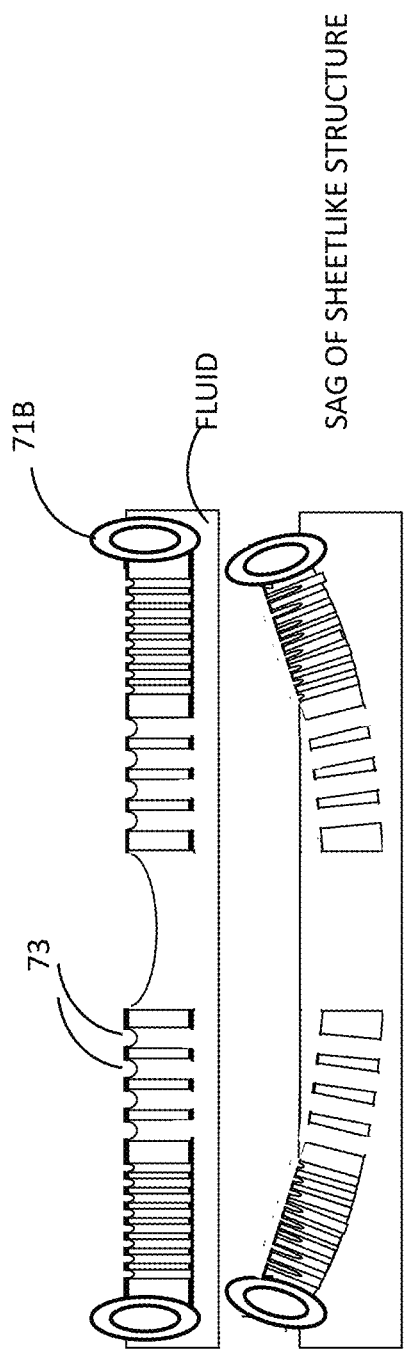
FIG. 7B illustrates how buoyancy features may be added at the ends of a sheet-like structure with varying degrees of sag.

For example, FIG. 7A illustrates how buoyancy features 71A may be added at the ends of a sheet-like structure 72 to suspend the structure between them. The buoyancy features may be attached to the sheet-like structures in multiple ways, which may vary the suspension height of the sheet-like features. FIG. 7B shows how the buoyancy features 71B may be arranged in multiple ways which may vary the amount of sag on the sheet-like structures. Suspension height and sag may affect the water surface area available for evaporation through details of the air/water interfaces at the surface and in the pores or pore-like features or openings 73 of the sheet-like structures.

The sheets may contain intentional openings large enough for marine and polar life-forms to climb or dive through, or they may be configured or deployed over small areas with larger open areas that can be set by use of other containment, tethering, or isolation features. The large opening areas and the periphery of the sheets can have contiguous areas that are buoyant enough to allow for wildlife pullouts for resting or breeding of creatures such as polar bears and walruses. The especially buoyant areas can be connected by other areas that are buoyant or stiff in order to set the spacing between the especially buoyant areas, and to possibly give walkable wildlife pathways between sections. The large opening areas may also serve as areas of enhanced ice formation and heat transfer, similar to polynyas (open areas of water surrounded by ice) and leads.

The underside of the floating elements or the periphery of the fabric sheets can contain features and openings to encourage the release of ice crystallites and young ice, in order to help maximize ice formation overall.

In one embodiment of the invention, ball-like floating objects may be used in conjunction with sheet-like structures. For example, floatable materials may be placed in the openings of the sheets. Doing so may provide the same benefits of using the sheet-like structures, but may also cut costs if the floatable materials are less costly than the sheet-like structures. In another embodiment, ball-like floating objects may be enclosed in sheet-like or mesh-like structures. For instance, the objects may be partially or fully enclosed in bags or other containers made from a fabric-like or mesh material.

Figure 7C:
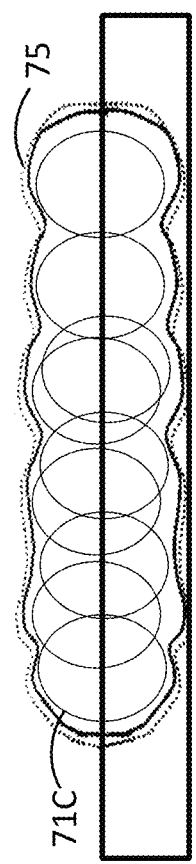
FIG. 7C illustrates how buoyancy features may be distributed within a sheet-like structure to distribute suspension of the fabric and provide multiple layers for albedo modification and evaporative surfaces.

FIG. 7C illustrates how buoyancy features 71C may be distributed within a sheet-like structure to distribute suspension of the fabric and provide multiple layers for albedo modification and evaporative surface. For instance, buoyant materials may be provided within a surrounding bag 75.

Figure 7D:
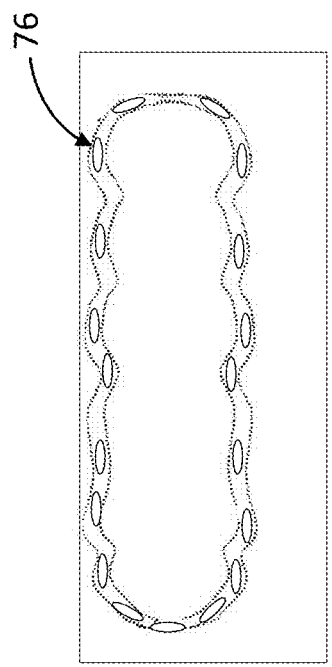
FIG. 7D illustrates how air entrained within natural or synthetic materials in a sheet-like structure may be used for distributed suspension.

FIG. 7D illustrates how air 76 entrained within natural or synthetic materials in a sheet-like structure may be used for distributed suspension.

Figure 7E:
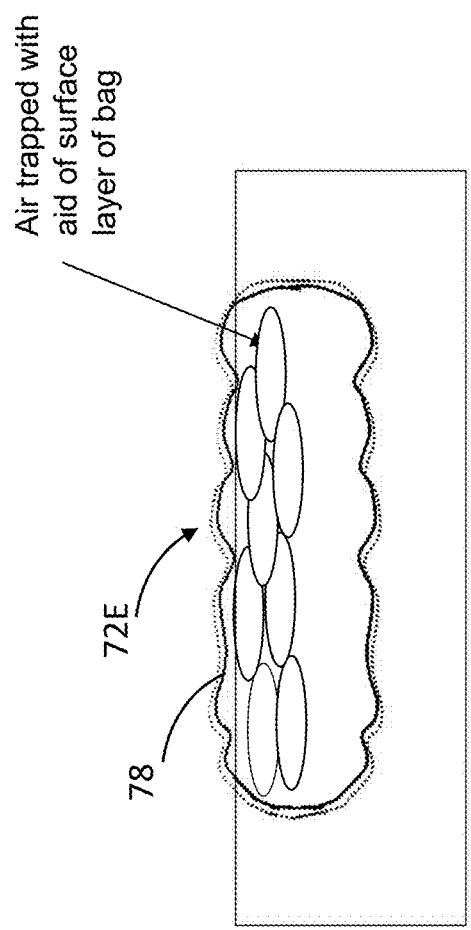
FIG. 7E illustrates how a surface coating of at least one material within a sheet-like structure may be used to aid in distributed suspension and/or evaporative transfer.

FIG. 7E illustrates how a surface coating of at least one material 78 within a sheet-like structure 72E may be used to aid in distributed suspension and/or evaporative transfer. Air trapped with the aid of a surface layer may aid in distributed suspension.

Figure 8:
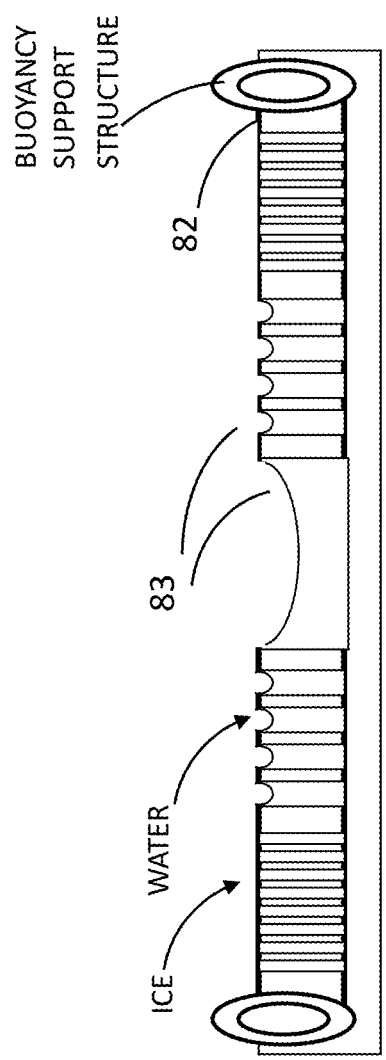
FIG. 8 shows how openings of different sizes of a material may be prone to freezing.

The sheets may be fabricated with varying opening sizes together or in varying sections. Smaller opening sizes may serve as areas that can have increased evaporative surface area and may be prone to freeze up before the larger opening sizes, as shown in FIG. 8. Openings 83 in the fabric 82 could allow for ocean turnover.

Figure 9A:
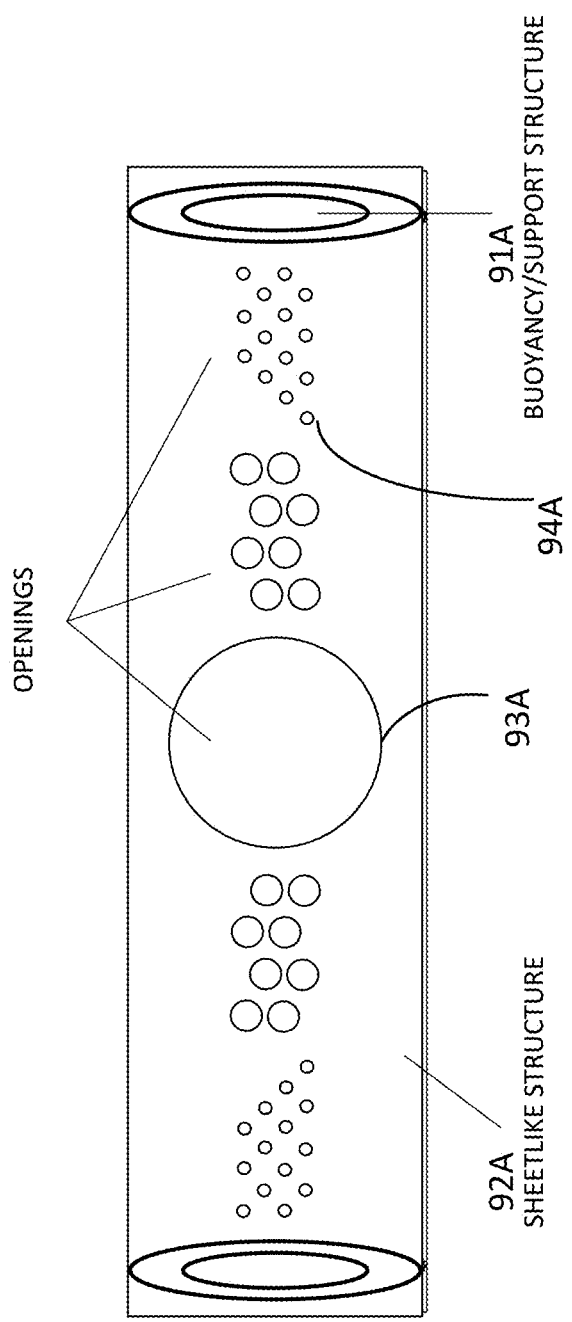
FIG. 9A shows a sheet style implementation in accordance with one embodiment of the invention.

FIG. 9A shows a sheet style implementation in accordance with one embodiment of the invention. A sheet-like structure 92A may include a buoyant support 91A at the edges or interior, that may act as support and temporary habitat rebuild. Underneath, there may be a provision for formed ice crystallites to float free, which may enhance new ice formation. Opening sizes, shapes, and location may vary. In one embodiment of the invention, one or more large interior holes 93A may be disposed between buoyant supports, and may provide marine life access and polynya-like heat transfer. Smaller pores may be closer to the buoyant supports and may provide enhanced surface area and evaporative transfer. Pores may have staggered sizes.

Figure 9B:
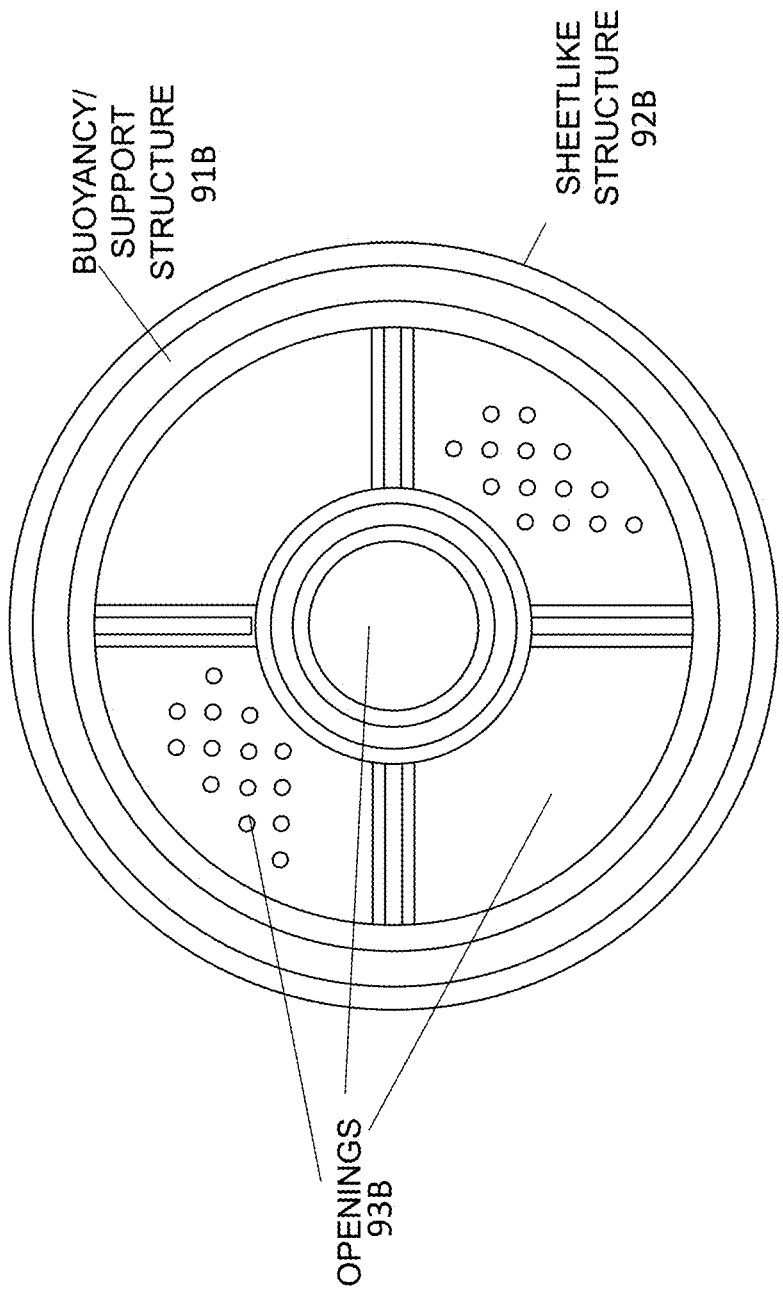
FIG. 9B shows an alternate embodiment of a sheet style implementation.

FIG. 9B shows an alternate embodiment of a sheet style implementation. Buoyant supports 91B may surround the sheet-like structures 92B. Buoyant features may also be at the interiors of a sheet-like structure in various configurations. The sheet-like structure may also provide openings 93B of various sizes, shapes, and location.

The wettability of the openings, the fabric thickness, and the height of the openings above the waterline may have an effect on the apparent surface area available for evaporation. To remove or reverse the action of the material over time, it could be made of biodegradable elements (for removal) or elements prone to biofouling (for reversal).

In one embodiment of the invention, sheets or fabrics may be placed on glaciers to provide environmental modification. For fabrics to be used on glaciers, they may be wetted on surfaces or within pores to provide and enhance an evaporative cooling effect.

d. Cooling Fins

In accordance with an alternate embodiment of the invention, the climate control materials may have cooling fins. Such cooling fins may be formed of any protrusion or sculpted feature that may stand out from a surface. For example, cooling fins may be an elongated shape that may stand out, be orthogonal to, or substantially perpendicular to the surface of a climate control material. In other examples, the cooling fins may be nubs, bumps, or waves on a surface, or any surface features that may increase surface area and may provide greater area for evaporation and heat transfer.

The cooling fins can be combined with any of the embodiments of the invention described herein. For example, cooling fins may be applied to plate structures, or on sheet-like structures.

e. Oils/Fluids

In accordance with one embodiment of the invention, floatable climate control materials may be comprised of oil or other fluid coatings. Fluid coatings may be formed of materials that would minimize harmful ecological impact while providing high albedo and evaporation rates, or especially low evaporation rates and high albedo for storm control applications. High albedo from fluid coatings may reduce the overheating of the ocean or body of water, even when evaporation is suppressed. In some embodiments, choosing a proper thickness of fluid coating may enable good reflectivity from the resulting optical properties of the ocean/fluid/air interfaces.

Some possible examples of fluid materials may include crude oil, vegetable oil, or mineral oil.

The benefit of using fluid materials is that they may affect albedo or overall reflectivity and be good for applications that require a low environmental evaporation rate. Alternatively, a fluid with a high evaporation rate may be used, which may cool the local area. A fluid climate control material may provide a thin layer, which could minimize costs. Fluids may also be easily poured out, which may make deployment simple. Fluids may also be surrounded by devices such as oil containment booms to localize them to occupy only the specified areas. Fluid coatings may be formed of materials that could minimize harmful ecological impact. Fluids could be used in combination with other materials, such as floating balls of various compositions 2. Building Blocks In one embodiment of the invention, the components of the climate control materials may be relatively small floatable materials, such as materials in roughly spherical shapes, bottles, roughly cylindrical fibers, or any other floatable materials that may be relatively loose. Such floatable materials may be arranged in such a way so that they form a unit, which may be a building block of an environmental modification system.

Figure 10:
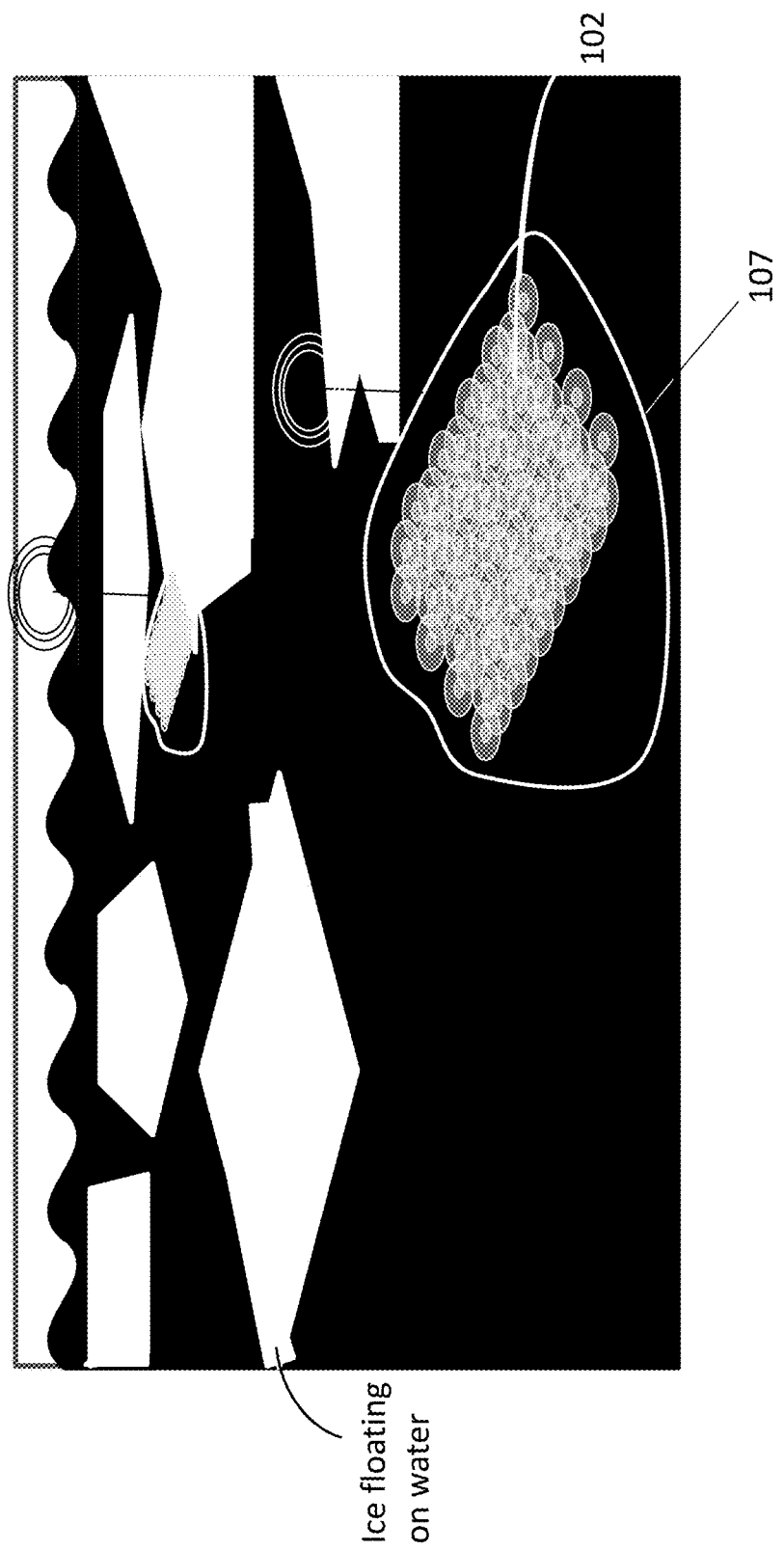
FIG. 10 illustrates a unit including a corral and enclosed climate control materials.

In accordance with one embodiment of this invention, FIG. 10 illustrates bringing the climate control materials 102 into a unit by using some sort of corral 107. In one example, a corral may completely surround the climate control materials. For example, an oil containment boom may serve as a corral. The invention may provide for a building block made up of a unit comprising the corral and the floatable climate control materials enclosed within.

Figure 11:
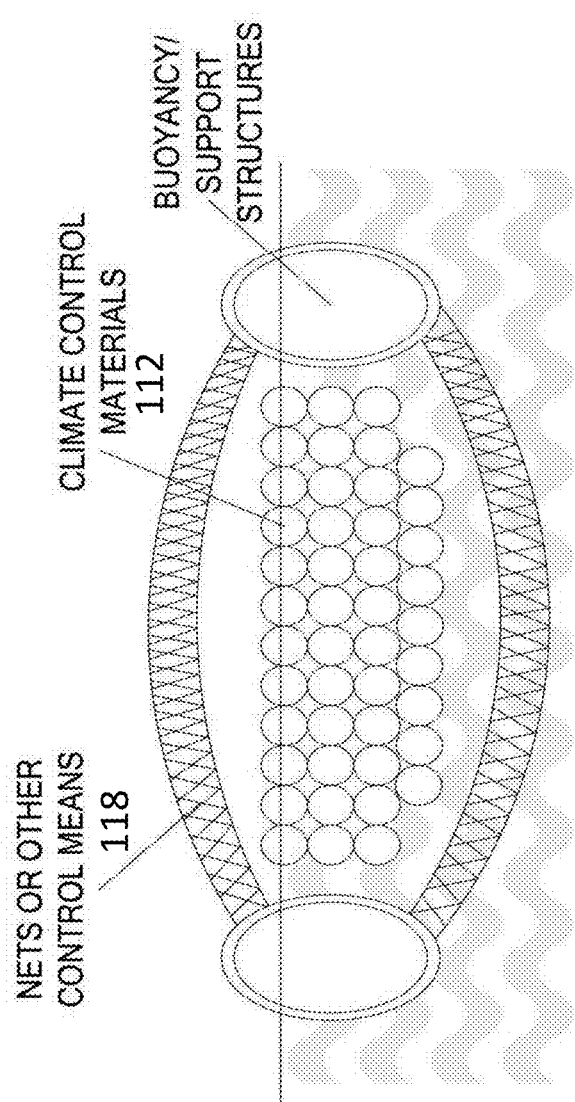
FIG. 11 shows a corral with submerged and above-water netting.

A corral may include submerged and/or above-water netting that could catch climate control materials even during severe storms, while allowing ice crystals to pass through and be blown out of the corral. FIG. 11 illustrates an embodiment of the invention where a corral may include the netting feature 118 with an escape path for ice crystals. The netting could be arranged so that they would capture any climate control materials 112 while allowing or encouraging ice crystals to be blown out of the area. In one implementation, the netting may also include a fabric-like material. In one embodiment, fabric-like material may have openings to allow ice crystals out while retaining climate control materials. In another embodiment, the corrals may include more than one layer of netting or fabric or other materials. The multiple layers may have different opening features which may encourage retention of climate control materials while allowing other objects to pass through. For instance, a corral may be a fabric or mesh bag that may contain the climate control materials. A corral may contain a measurement system that can include sensors, powering, and communications.

Figure 12:
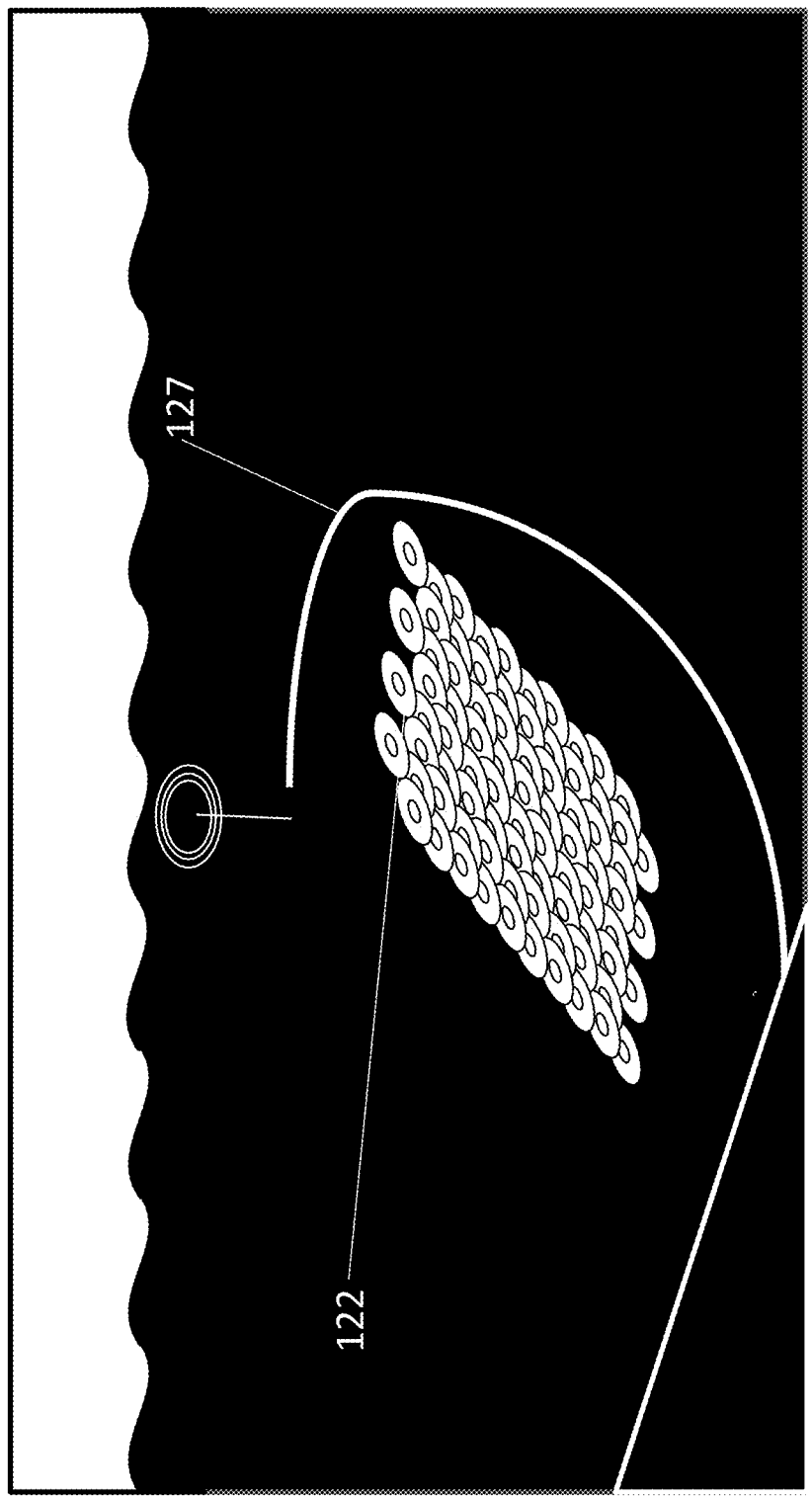
FIG. 12 shows a unit including a corral and accompanying climate control materials.

FIG. 12 shows another possible corralling arrangement for climate control materials. In this example, the corral 127 may only partially surround the materials 122, rather than surrounding them completely. The invention may provide for a building block made up of a unit comprising the corral and the accompanying floatable climate control materials.

In an alternate embodiment of the invention, the components of climate control materials may be plates of varying shapes or sizes. It can be deployed in a shape to allow a manner of self-assembly after having been deployed in some manner, such as having been shipped in, deployed by a submarine, or dropped from an airplane or helicopter. Minimizing assembly time onsite may be advantageous. In order to do so, such plates may have various interconnecting means. One example of an interconnecting means are lock-and-groove features on the sides of the plates. Another example of interconnecting means may include a snap-together assembly. Such interlocking features may be reversible as well in case the system overcorrects and it is necessary to remove it.

Figure 13A:
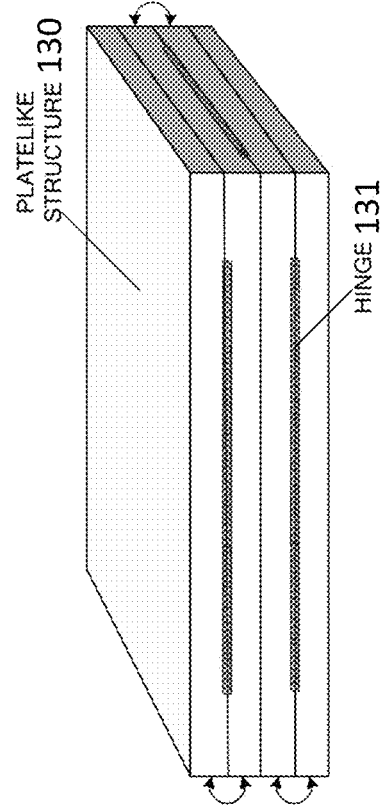
FIG. 13A illustrates a rectangular plate unit with hinges in its folded state.
Figure 13B:
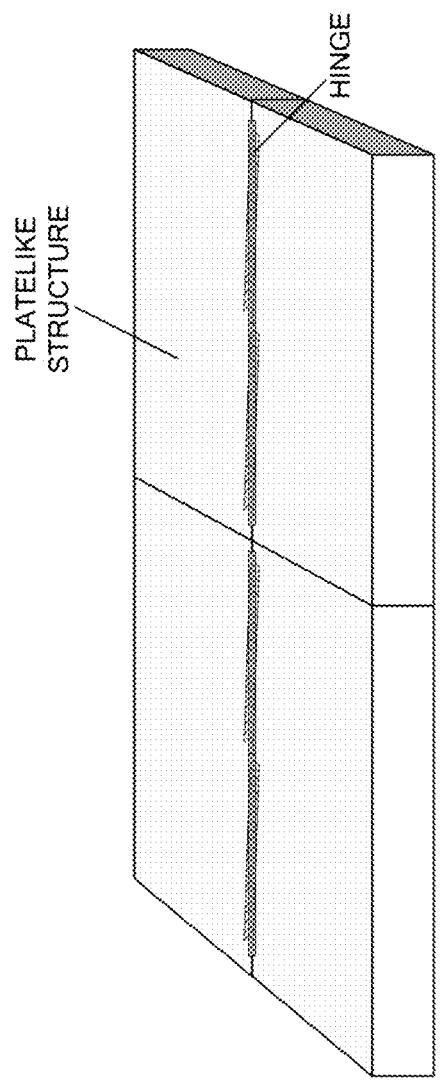
FIG. 13B illustrates a rectangular plate unit with hinges in its unfolded state.

Another means of plate interconnectedness may include hinging plates together, so that they may form a smaller shape that can be unfolded upon deployment into a bigger shape. For example, FIG. 13A illustrates a rectangular plate unit 130 with hinges 131 in its folded up state. Such a structure may be more compact and easier to deploy. FIG. 13B shows the rectangular plate unit 130 after it has been unfolded. Using an unfolding technique may also minimize on-site assembly time and complexity.

Figure 14C:
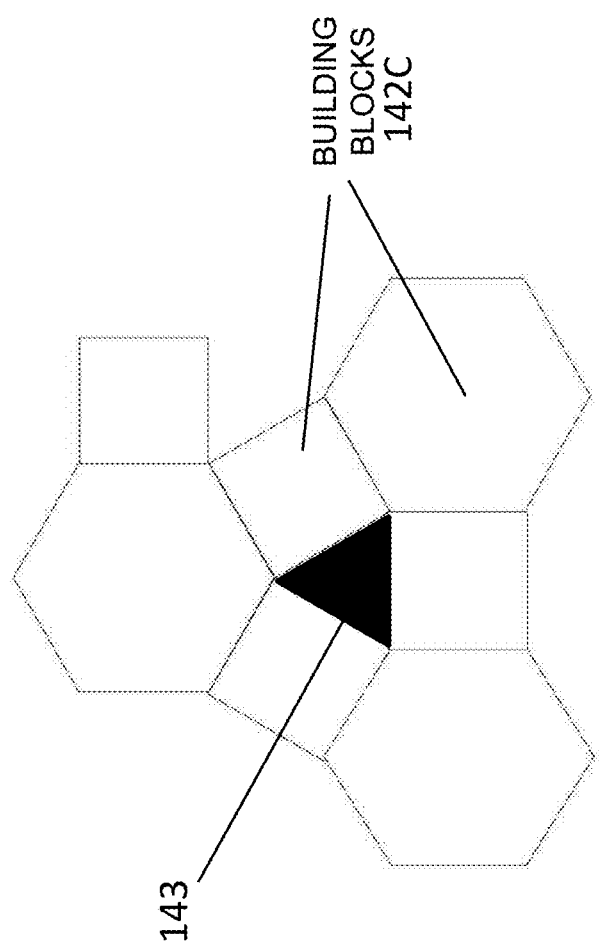
FIG. 14C shows an example of plates of different shapes interconnecting to form a building block with open spaces.

FIG. 14A, 14B shows an example of plates being used as building components that have been interlocked to form building blocks. The figures show a top view of the plates 142A, 142B that have been interlocked. In these examples, the shapes of the components may be such that they can interlock to form a continuous plate 140A, 140B. FIG. 14C shows an example of plates 142C interlocking but not to form one continuous plate. In some applications, it may be advantageous to allow interlocking plates but leave gaps 143. Interlocking plates may have different shapes. Using a combination of shapes that may interlock may enable flexibility in determining what shapes to make the building blocks.

In an embodiment of the invention, the climate control components may consist of sheet-like structures. Sheets may have interconnecting means, and may also be foldable, like the plate structures. The interconnecting means of the sheets may or may not be the same type of mechanisms of the plates. For example, sheets may have buoyancy features at their edges, which may provide support and interconnecting means. For example, buoyancy features at the edge of sheets may have similar assemblies to plate-like climate control materials, such as lock-and-groove assemblies and snap-together assemblies.

The components of climate control materials may include fluid materials in accordance with another embodiment of the invention. Fluid climate control materials may be enclosed in a corral, such as previously discussed for relatively small floatable materials.

3. Building Cluster Containers

In one embodiment of the invention, the components of the climate control materials may be pre-clustered so that they form a unit. Such units may be arranged or distributed in different manners to form a cluster.

Figure 15:
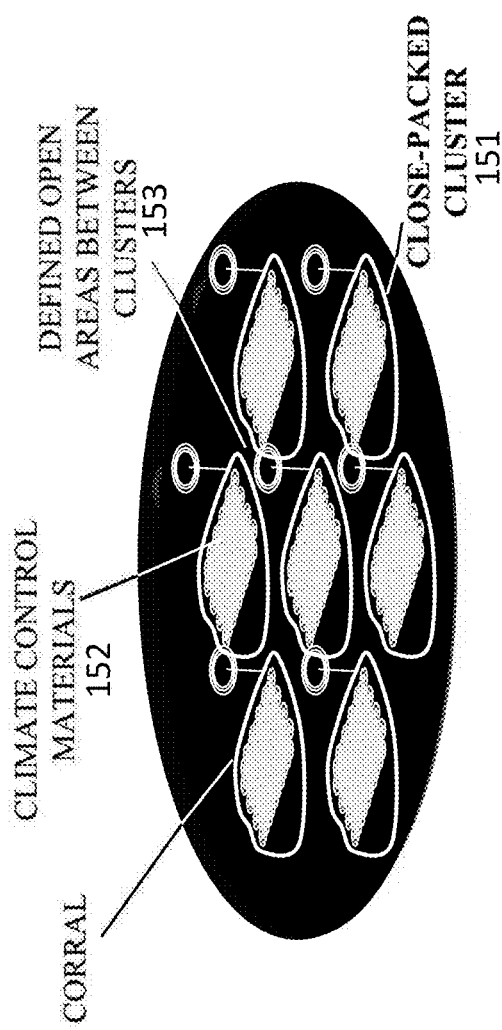
FIG. 15 shows an example of a building cluster for floatable climate control materials.

FIG. 15 shows one example of a building cluster for floatable climate control materials. Climate control materials 152 may be corralled into units 151 which may be clustered in a roughly hexagonal close packed arrangement. There may also be some open areas or spaces 153 defined between the clusters which may allow the effects of the deployment to be enhanced through coverage of a larger area. The hexagonal close packed array can, within the scope of the invention, be further extended out to include more elements. In one implementation, the corralled structures might include means for connecting the corrals in a desirable fashion.

Figure 16A:
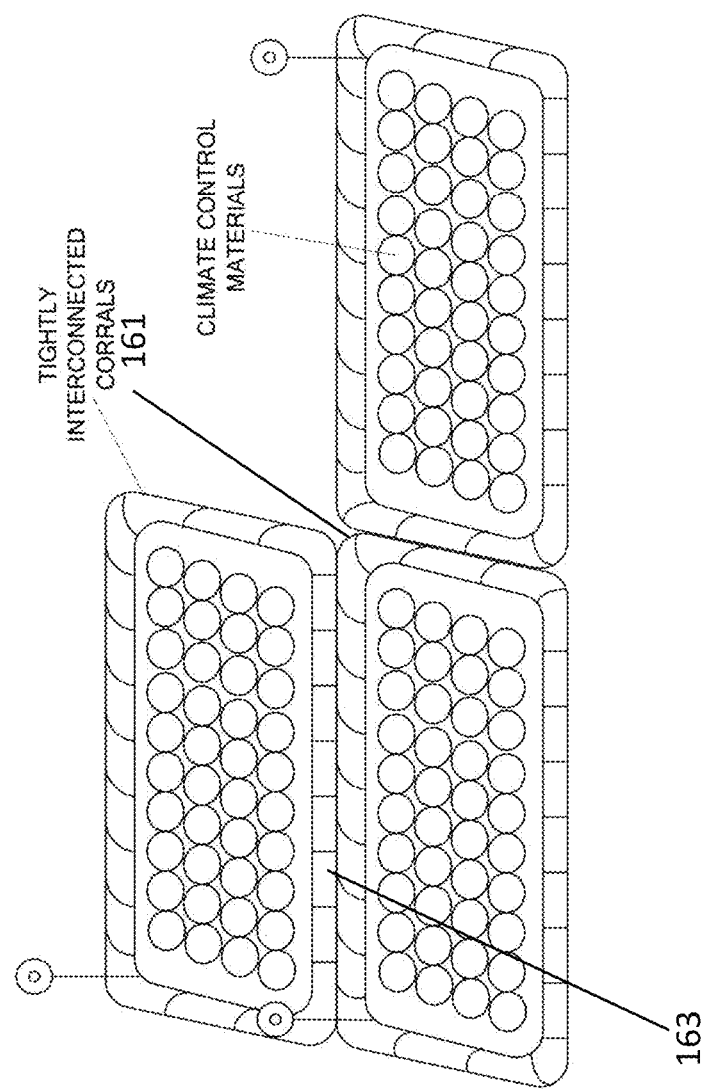
FIG. 16A shows a tightly-interconnected corral structure.
Figure 16B:
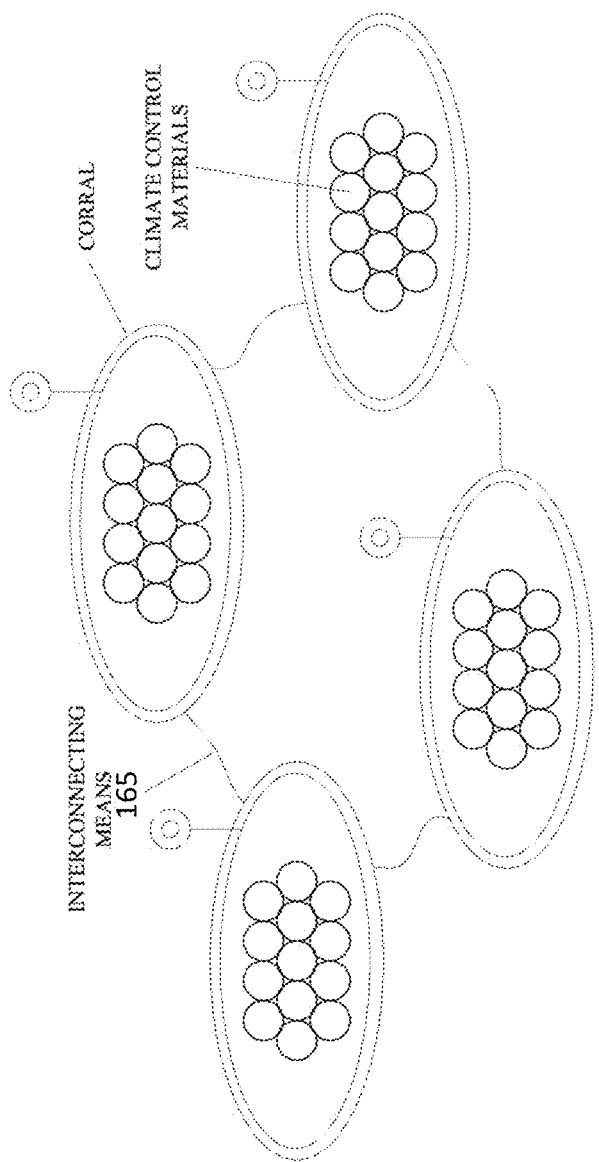
FIG. 16B shows a loosely-interconnected corral structure.

For example, the corralled structures 161 may be connected to one another by connecting buoyant portions 163 of the corrals to one another, as shown in FIG. 16A. In one implementation, the corrals may be connected by some interconnecting means, similar to interconnecting means discussed previously, such as the lock-and-groove assemblies, snap-together assemblies, or other assemblies, such as tying the corrals together. In another example, the corralled structures may be connected to one another through other mechanisms which may be looser, such as lines 165 or chains or other flexible means, as shown in FIG. 16B.

As in several of the embodiments described above, a corral or containment boom can be used to constrain the elements of the system before, as or after they self-assemble or otherwise move into position. Corrals may use submerged and/or above-water netting, as discussed previously.

Corrals can be devised with control means which can serve to keep the materials, devices and system removed from shipping lanes and the like.

Embodiments of materials, designs, and other systems for environmental climate control materials may be deployed or used in methods described in U.S. Application No. 61/044,453, filed on Apr. 11, 2008, which is hereby incorporated by reference herein in its entirety.

C. Materials Production

In one embodiment of the invention, the climate control materials may include plates or sheet-like structures. One method of producing such materials may involve starting from smaller material components, such as beads, and heating them so that they may fuse together. In some implementations, the smaller components may be of low melting temperatures, such as low-melting temperature glass or beads. The smaller components may or may not have different material properties, and may be fused into a flat sheet or plate with a desired pattern.

Materials can be by-products of other operations, such as cenospheres which are a byproduct from coal-fired plants, and can be prepared to be used in the present invention by means such as sieving to get a desired particle size, washing, and surface preparations. These and other suitable materials can be prepared as desired, with or without surface treatments, and assembled into aggregates or deployed as-is, by dropping, folding, unrolling, and the like.

D. Sensors

1. Sensor Systems

Another embodiment of the invention may include sensors that may monitor the invention and the effects of the invention. Communication and powering for such sensors that may be advantageously incorporated in this invention may include communication means for remote monitoring, data logging for eventual on-site data collection and aggregation, and remote or local powering (solar, batteries, or wireless powering) of the sensors and communication means.

This can be accomplished in several ways, including placing sensors near the deployment of climate control materials. For example, sensors and communication and powering equipment may be placed on or within a corral such as a containment boom such as used for containing oil spills that may be used to surround floating climate control materials, as shown in FIG. 10. Additionally, such equipment could be placed on or within a buoy deployed in or near the area of floating materials. Some or all of the sensor, communication and powering equipment may also be placed on or within a suspension element deployed in or near the area of materials used to adjust local albedo and/or evaporation rate. Alternatively, some or all of the sensors, communications and powering equipment may be placed in or on the materials themselves.

In addition to being incorporated into buoys, anchor points, containment booms and the like, the sensors, communications systems, and powering may also be placed at nearby shores, and similar locations. They can be powered in a variety of ways, such as being solar powered, or being powered by batteries or remote wireless communication. The sensors can also be interrogated and surveyed remotely, such as via satellite or submarine, and/or can upload data periodically to a data logger to be picked up or interrogated at a later point (for instance, when the weather permits access to the system location). Small sensors such as so-called smartdust sensors with self-configuring wireless communications networks may be advantageously employed in this invention.

In one embodiment of the invention, the optical properties of climate control materials may also be chosen or treated in order to provide ease of detection from satellites or other remote sensing devices. Adjusting optical properties such as surface, color, translucency, or reflectivity may aid in sensing applications, which may provide information and enable control of the materials if necessary. Adjusting optical properties of materials may not only apply to optical sensing devices, but may have effects which can be read by other devices. For example, climate control materials with certain optical properties may also have a unique heat signature which may be read by a thermal sensing device.

As mentioned previously, signatures may be provided on the climate control materials themselves, in the event that they may break free and may continue to be monitored. For example, radio frequency identification (RFID) may be used on the materials. The materials may have RFID tags incorporated, which may be read remotely. In another example, the materials may use so-called smartdust type sensors, which may include tiny MicroElectroMechanical Systems (MEMS) sensors or micromachined or microfabricated sensors with wireless communications.

2. Sensor Types

There may be many types of sensors that can monitor climate control materials and their effects. Some sensor types that are advantageously incorporated in this invention include a GPS and identifying information to locate and monitor the location and effects of the implementation.

Above the ice, there may be sensors that can monitor information such as humidity, temperature, albedo, evaporation rate, and freezing rate. The above-ice sensors may use a satellite tracking signature.

Sensors may also be dispatched within the ice, which may measure physical features of the ice, such as ice morphology, thickness, albedo, and snow cover. Sensors may also measure properties of the ice such as salinity, channel morphology, porosity, thermal conductivity, stress, strain, and strength.

Sensors may be deployed below the ice to measure environmental information such as salinity, temperature, freezing depth, and circulation patterns. Sensors below the ice may determine effects on the ecosystem, and may try to determine solar absorption at the below-ice surface and at various depths beneath the surface.

Sensors may not be necessary for deployment with the climate control materials in accordance with one embodiment of the invention. For instance, sensors may not be necessary for wider implementations after an implementation strategy has been chosen from evaluating data from the initial experimentation and implementation.

3. Controls

In some embodiments of the invention, the sensors may include a control capability, which may affect the climate control materials. This ability to provide feedback may enable applications such as sensing when it may be advantageous to move climate control materials and act accordingly. This may also include the ability to monitor and change albedo or evaporation rates of local areas associated with the materials.

E. Environmental Modification and Other Applications

The materials, designs, apparatuses, and arrangements described herein may be used with any methods for environmental climate control modification, as described in PCT application Ser. No. PCT/US08/11690, entitled "Methods for Environmental Modification with Climate Control Materials and Coverings" by Leslie A. Field, filed Oct. 9, 2008, which is hereby incorporated by reference herein in its entirety.

The ability for local environmental climate control may be useful in scenarios relating to global warming, and even in situations where another means of control for global warming have been instituted or in the absence of global warming. Possessing the capability to tailor climate locally and globally using the techniques of the current invention may have advantageous applications.

In one application of the invention, the systems may be used to rebuild polar ice. In such an application, it may be preferable for climate control materials and coverings to have high albedo and increase local evaporation rates, as discussed previously. Other material properties and designs may be optimized for polar ice rebuild.

In another application of the invention, the systems may be used as an interim habitat for various species in itself, and optionally while the polar ice rebuilds. One example of this may include the pullout for polar bears, walruses, or other species, as mentioned previously. In addition to having high albedo and increasing local evaporation rates, the climate control materials used in these applications may have a high buoyancy. If the systems are being used as an interim habitat, it may not be necessary to use the invention to rebuild ice.

The systems may be used for glacier retention or rebuilding in accordance with another application of the invention. Climate control materials may be scattered on glacier surfaces or otherwise distributed on or nearby the glacier surfaces or open water. Such materials may have a high albedo and increase local evaporation rates. Similarly, the systems can be used for snow retention and building in sensitive climate and recreational areas.

Another environmental modification application may include crop environmental modification. Climate control materials may be used for temperature and moisture control. The albedo of the materials may affect how much sunlight is reflected, which may affect local temperature. Furthermore, the evaporation rate can be adjusted as desired.

In another application, by properly controlling the rate of evaporation over bodies of water, the invention can be used at the proper time of the year to diminish the intensity of tropical storms, and removed following the storm season to allow normal evaporation levels. In this application, a device, system or method may be used to adjust the albedo of areas in order to decrease evaporation to decrease rainfall and/or storm severity. In addition, the invention may be used for adjustment of the relative humidity of areas surrounding the adjusted areas in order to decrease evaporation to decrease rainfall and/or storm severity. Aspects of the invention may be adjusted as discussed previously, with characteristics tailored to reduce evaporation.

One preferable embodiment of the invention that may be applied to the storm control aspect of the invention may be to use a monolayer coating of a liquid (akin to "pouring oil on troubled waters") that may reduce the evaporation rate of the water in the storm path. The effect of the fluid coating may be temporary, and it may be removed, either by dispersal, by biodegradation, or by being consumed by wildlife or other environmental actions or agents. Such a fluid coating may be chosen to have a small or zero ecological impact, and may advantageously include materials such as mineral oils or vegetable oils (including corn oil, given current high production levels of corn).

A plastic sheet, preferably without pores, or rafts of plastic bottles as described previously, but chosen or treated so as to be largely unwettable may also be advantageous embodiments of this invention for a storm control application.

This invention may be applied to rainfall pattern modification as well. By properly controlling the rate of evaporation over bodies of water, the invention can be used to enhance evaporation to increase rainfall and/or alleviate conditions of drought. In this application of the invention, a climate control material may adjust the albedo or relative humidity of areas in order to enhance evaporation to increase rainfall and/or alleviate drought. The system may be removable when no longer needed, to allow the area to return to its normal weather pattern.

This invention may also be used in applications requiring increased efficiency of cooling, such as for industrial applications such as power plants and large data centers, especially in regions where excess heat has an adverse environmental impact.

Furthermore, this invention can be used to stabilize permafrost, with a possible side benefit of preventing release of methane (a powerful greenhouse gas) and a benefit of stabilizing infrastructure used for housing, roads, pipelines, utilities and the like.

The techniques of this invention can be further used to contribute environmental control to man-made structures and buildings, introducing a cooling element to such facilities.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A method for cooling the temperature of a body of water having a top surface exposed to sunlight, the method comprising:

distributing balls such that they lie on, and in direct contact with, at least part of the top surface, the at least part of the top surface characterized prior to the distribution by a pre-distribution surface area, and characterized after the distribution by a residual exposed water surface area;

wherein the balls have diameters within a range of 100 microns to 3 mm, and outer surfaces of the balls have albedos within a range of 0.15 to 1.0; and wherein the outer surfaces of the balls are hydrophilic, such that after the distribution the balls are characterized by a total wetted surface area, and the residual exposed water surface area plus the total wetted surface area is greater than the pre-distribution surface area of the water, facilitating the cooling.

2. The method of claim 1 wherein the body of water is a natural or unnatural lake or bay.

3. The method of claim 1 wherein the albedos of the balls are within a range of 0.35-1.0.

4. The method of claim 3 wherein the albedos of the balls are within a range of 0.5-1.0.

5. The method of claim 4 wherein the albedos of the balls are within a range of 0.7-1.0.

6. The method of claim 1 wherein the balls include pores with diameters less than 100 microns.

7. The method of claim 1 wherein the diameters of the balls are within a range of 0.015-1 mm.

8. The method of claim 1 wherein the diameters of the balls are within a range of 0.1-1 mm.

9. The method of claim 1 wherein the balls comprise a mixture of differently-sized balls.

10. The method of claim 1 additionally comprising a corralling structure configured to contain the balls following deployment over the water surface.

11. The method of claim 1 additionally comprising deploying a sensor configured to monitor an effect of the balls on the environment after distribution.

12. The method of claim 1 additionally comprising deploying at least one of communication and powering equipment.

13. The method of claim 1 additionally comprising deploying a position-monitoring sensor.

14. The method of claim 1 wherein the balls are self-removing from carbon uptake, cracking induced by freezing, wear, and/or from an enclosure sinking and dragging down the balls.

15. The method of claim 1 wherein the balls comprise recycled glass and air-entrapping pores.

16. The method of claim 1 wherein the balls are hollow glass microspheres.

* * * * *